(12) United States Patent
Wang et al.

(10) Patent No.: US 10,817,586 B2
(45) Date of Patent: Oct. 27, 2020

(54) WEB PAGE ANNOTATION DISPLAYING METHOD AND APPARATUS, AND MOBILE TERMINAL

(71) Applicant: Tencent Technology (Shenzhen) Company Limited, Shenzhen (CN)

(72) Inventors: Zhishou Wang, Shenzhen (CN); Bo Hu, Shenzhen (CN); Chao Ren, Shenzhen (CN); Guang Li, Shenzhen (CN); Jianbo Ding, Shenzhen (CN); Huagao Li, Shenzhen (CN); Xijun Miao, Shenzhen (CN); Jiang Zhu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 76 days.

(21) Appl. No.: 15/698,440

(22) Filed: Sep. 7, 2017

(65) Prior Publication Data
US 2018/0067954 A1 Mar. 8, 2018

Related U.S. Application Data

(63) Continuation-in-part of application No. PCT/CN2016/085474, filed on Jun. 12, 2016.

(30) Foreign Application Priority Data

Jul. 22, 2015 (CN) .......................... 2015 1 0434902

(51) Int. Cl.
*G06F 17/00* (2019.01)
*G06F 16/958* (2019.01)
(Continued)

(52) U.S. Cl.
CPC .......... *G06F 16/958* (2019.01); *G06F 16/955* (2019.01); *G06F 16/9558* (2019.01); *G06F 40/169* (2020.01)

(58) Field of Classification Search
CPC ..................................................... G06F 16/958
See application file for complete search history.

(56) References Cited

U.S. PATENT DOCUMENTS 9,430,141 B1 * 8/2016 Lu ......................... G06F 17/241
9,563,614 B2 * 2/2017 Zhang .................... G06F 17/241
(Continued)

FOREIGN PATENT DOCUMENTS

| CN | 101739415 A | 6/2010 |
| CN | 102446175 A | 5/2012 |

(Continued)

OTHER PUBLICATIONS

Tencent Technology, ISRWO, PCT/CN2016/085474, Sep. 18, 2016, 10 pgs.

(Continued)

*Primary Examiner* — Mustafa A Amin
(74) *Attorney, Agent, or Firm* — Morgan, Lewis & Bockius LLP

(57) ABSTRACT

A method for annotating a target web page is performed at a terminal by: obtaining information content of the target web page and displaying the target web page; sending an annotation obtaining request to a server, the annotation obtaining request carrying an identifier of the target web page, wherein the server is configured to return a first web page annotation and information of first annotation position in the target web page, the first web page annotation including content that is annotated on the target web page before a current time, and the first annotation position information being used to determine a display position of the (Continued)

US 10,817,586 B2

Page 2 first web page annotation in the target web page; and dynamically displaying the first web page annotation on the target web page based on the first annotation position information after the first web page annotation and the first annotation position information are received.

15 Claims, 13 Drawing Sheets

(51) Int. Cl.
*G06F 16/955* (2019.01)
*G06F 40/169* (2020.01)

(56) References Cited

U.S. PATENT DOCUMENTS

| 2002/0083094 | A1* | 6/2002 | Golovchinsky | G06F 3/04883 |
| | | | | 715/205 |
| 2003/0081000 | A1 | 5/2003 | Watanabe et al. | |
| 2004/0205542 | A1* | 10/2004 | Bargeron | G06F 17/241 |
| | | | | 715/201 |
| 2004/0252888 | A1* | 12/2004 | Bargeron | G06F 17/242 |
| | | | | 382/188 |
| 2007/0089051 | A1* | 4/2007 | Madan | G06F 17/241 |
| | | | | 715/234 |
| 2008/0098295 | A1* | 4/2008 | Nelson | H04L 29/06027 |
| | | | | 715/233 |
| 2009/0044144 | A1* | 2/2009 | Morris | G06F 3/04842 |
| | | | | 715/804 |
| 2009/0199133 | A1* | 8/2009 | Deutsch | G06F 16/00 |
| | | | | 715/811 |
| 2009/0217150 | A1* | 8/2009 | Lin | G06F 16/957 |
| | | | | 715/232 |
| 2011/0039598 | A1* | 2/2011 | Tang | H04N 5/772 |
| | | | | 455/556.1 |
| 2013/0031455 | A1* | 1/2013 | Griffiths | G06F 17/2247 |
| | | | | 715/230 |
| 2013/0091240 | A1* | 4/2013 | Auger | G06F 17/241 |
| | | | | 709/217 |
| 2013/0254215 | A1* | 9/2013 | Davar | H04L 65/403 |
| | | | | 707/748 |
| 2014/0019884 | A1* | 1/2014 | Dinan | H04L 12/1813 |
| | | | | 715/758 |
| 2014/0032616 | A1* | 1/2014 | Nack | G06F 17/241 |
| | | | | 707/805 |
| 2016/0043974 | A1* | 2/2016 | Purcell | H04L 51/046 |
| | | | | 715/758 |
| 2016/0203114 | A1* | 7/2016 | Karalis | H04L 67/02 |
| | | | | 715/230 |
| 2018/0024975 | A1* | 1/2018 | Ramakrishnan | G06F 17/241 |
| | | | | 715/230 |

FOREIGN PATENT DOCUMENTS

| CN | 102609401 A | 7/2012 |
| CN | 102682025 A | 9/2012 |
| CN | 102799573 A | 11/2012 |
| CN | 102833277 A | 12/2012 |
| CN | 102982148 A | 3/2013 |
| CN | 105095432 A | 11/2015 |
| JP | 2000047991 A | 2/2000 |
| JP | 2001209659 A | 8/2001 |
| JP | 2009140020 A | 6/2009 |

OTHER PUBLICATIONS

Tencent Technology, IPRP, PCT/CN2016/085474, Jan. 23, 2018, 8 pgs.

* cited by examiner

WEB PAGE ANNOTATION DISPLAYING METHOD AND APPARATUS, AND MOBILE TERMINAL

RELATED APPLICATION

This application is a continuation-in-part of PCT/CN2016/085474, entitled "METHOD AND DEVICE FOR DISPLAYING WEBPAGE ANNOTATION, AND MOBILE TERMINAL" filed on Jun. 12, 2016, which claims priority to Chinese Patent Application No. 201510434902.0, filed with the State Intellectual Property Office of the People's Republic of China on Jul. 22, 2015, and entitled "WEB PAGE ANNOTATION DISPLAYING METHOD AND APPARATUS", both of which are incorporated herein by reference in their entirety.

FIELD OF THE TECHNOLOGY

The present application relates to the field of the Internet, and in particular, to a web page annotation displaying method and apparatus, and a mobile terminal.

BACKGROUND OF THE DISCLOSURE

With the rapid development of the Internet, increasingly more application programs that can be used to browse a web page appear. These application programs may be installed on a terminal such as a mobile phone or a tablet computer. When browsing a web page by using these application programs, to record content such as comprehension, reflections, and opinions for the web page, a user may select some text information on the web page, and annotates the selected text information on the web page. When the user browses the web page again, the terminals may display the web page annotation of the web page, to facilitate viewing and understanding of the user.

Currently, the operation of displaying a web page annotation by a terminal may be as follows: When the terminal receives an instruction for displaying a target web page, the terminal may obtain information content of the target web page from a server, and display the information content, and at the same time, the terminal may obtain, from the server, a web page annotation on the target web page and selected text information corresponding to the web page annotation, then the terminal may perform matching on the information content of the target web page based on the selected text information, to determine the selected text information from the information content of the target web page, and then the terminal may display the web page annotation at a position of the determined selected text information.

When the terminal displays the web page annotation by using the foregoing method, if multiple pieces of same selected text information exist in the information content of the target web page, the web page annotation may be incorrectly displayed, consequently reducing accuracy of displaying of the web page annotation. For example, when the selected text information is "travel", if multiple "travel"s exist in the information content of the target web page, the terminal displays the web page annotation at only a position at which the first "travel" in the multiple "travel"s is located. As a result, the web page annotation may be incorrectly displayed.

SUMMARY

To resolve the foregoing technical problem, embodiments of the present application provide a web page annotation displaying method and apparatus, and a mobile terminal. The technical solutions are as follows:

According to a first aspect, a web page annotation displaying method is provided, including:
  obtaining information content of a target web page when an instruction for displaying the target web page is received;
  sending an annotation obtaining request to a server, the annotation obtaining request carrying an identifier of the target web page, so that the server returns a first web page annotation and information of first annotation position in the target web page, the first web page annotation including content that is annotated on the target web page before a current time, and the first annotation position information being used to determine a display position of the first web page annotation in the target web page; and
  displaying the first web page annotation on the target web page based on the first annotation position information after the first web page annotation and the first annotation position information are received.

According to a second aspect, a web page annotation displaying apparatus is provided, including:
  an obtaining module, configured to obtain information content of a target web page when an instruction for displaying the target web page is received;
  a first sending module, configured to send an annotation obtaining request to a server, the annotation obtaining request carrying an identifier of the target web page, so that the server returns a first web page annotation and information of first annotation position in the target web page, the first web page annotation including content that is annotated on the target web page before a current time, and the first annotation position information being used to determine a display position of the first web page annotation in the target web page; and
  a first displaying module, configured to display the first web page annotation on the target web page based on the first annotation position information after the first web page annotation and the first annotation position information are received.

According to a third aspect, a mobile terminal is provided, including:
  one or more processors, and
  a memory, where
  one or more programs being stored in the memory, the one or more programs being configured to be executed by the one or more processors, and the one or more programs including an instruction used to perform the following operations:
  obtaining information content of a target web page when an instruction for displaying the target web page is received;
  sending an annotation obtaining request to a server, the annotation obtaining request carrying an identifier of the target web page, so that the server returns a first web page annotation and information of first annotation position in the target web page, the first web page annotation including content that is annotated on the target web page before a current time, and the first annotation position information being used to determine a display position of the first web page annotation in the target web page; and
  displaying the first web page annotation on the target web page based on the first annotation position information after the first web page annotation and the first annotation position information are received.

Beneficial effects brought by the technical solutions provided in the embodiments of the present application are as follows: In the embodiments of the present application, when a terminal receives an instruction for displaying a target web page, the terminal obtains information content of the target web page, and sends an annotation obtaining request to a server, where the annotation obtaining request carries an identifier of the target web page, so that the server returns a first web page annotation and information of first annotation position in the target web page, where the first annotation position information is used to determine a display position of the first web page annotation in the target web page. When the terminal receives the first web page annotation and the first annotation position information, the terminal displays the first web page annotation on the target web page based on the first annotation position information. In the present disclosure, a web page annotation of a target web page is accurately positioned by using position information of the web page annotation, thereby avoiding the problem that a web page annotation may be incorrectly displayed when multiple pieces of same selected text information exist, and improving accuracy of displaying of the web page annotation.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DESCRIPTION OF EMBODIMENTS

To make the objectives, technical solutions, and advantages of the present disclosure clearer, implementation manners of the present application are described in further detail below with reference to the accompanying drawings.

Figure 1A:
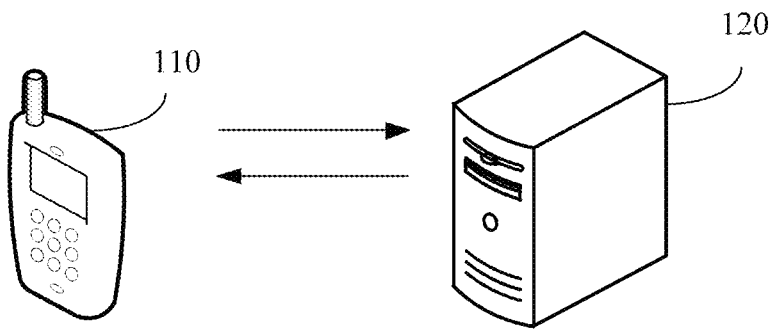
FIG. 1A is a schematic diagram of an implementation environment used in a web page annotation displaying method according to an embodiment of the present application.

FIG. 1A is a schematic diagram of an implementation environment used in a web page annotation displaying method according to an embodiment of the present application. Referring to FIG. 1A, the implementation environment may include a terminal 110 and a server 120. The terminal 110 may be a mobile phone, a computer, a tablet computer, or the like. The server 120 may be one server, or may be a server cluster including multiple servers, and the terminal 110 and the server 120 may communicate with each other by using a wired connection or a wireless connection. When the terminal 110 receives an instruction for displaying a target web page, the terminal 110 may obtain information content of the target web page, and send an annotation obtaining request to the server 120, so as to obtain a first web page annotation and information of first annotation position in the target web page from the server 120. Then, the terminal 110 may display the first web page annotation on the target web page based on the first annotation position information of the target web page. When the server 120 receives the annotation obtaining request sent by the terminal 110, the server 120 may determine the first web page annotation and the first annotation position information of the target web page based on the annotation obtaining request, and send the first web page annotation and the first annotation position information of the target web page to the terminal 110.

Figure 1B:
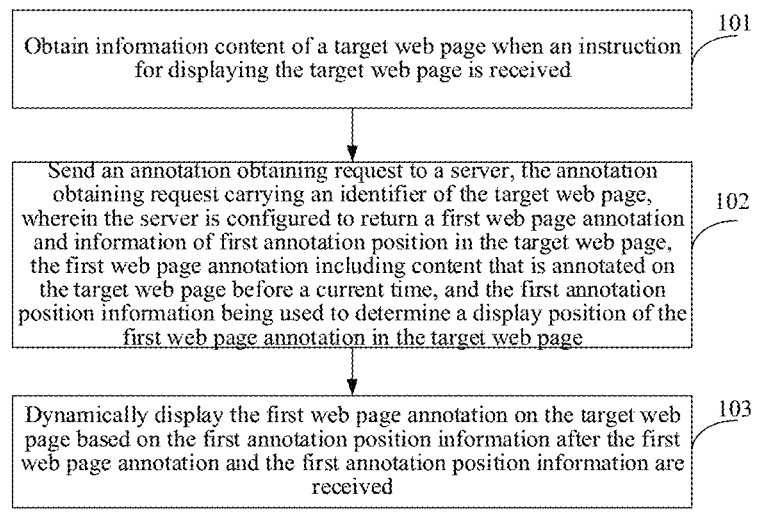
FIG. 1B is a flowchart of a web page annotation displaying method according to an embodiment of the present application.

FIG. 1B is a flowchart of a web page annotation displaying method according to an embodiment of the present application. Referring to FIG. 1B, the method includes the following steps:

Step 101. Obtain information content of a target web page when an instruction for displaying the target web page is received. The target web page is then rendered by, e.g., a web browser application running at the terminal 110.

Step 102. Send an annotation obtaining request to a server, the annotation obtaining request carrying an identifier of the target web page, so that the server returns a first web page annotation and information of first annotation position in the target web page, the first web page annotation including content that is annotated on the target web page before a current time, and the first annotation position information being used to determine a display position of the first web page annotation in the target web page.

Step 103. Display the first web page annotation on the target web page based on the first annotation position information after the first web page annotation and the first annotation position information are received.

In this embodiment of the present application, when a terminal receives an instruction for displaying a target web page, the terminal obtains information content of the target web page, and sends an annotation obtaining request to a server, where the annotation obtaining request carries an identifier of the target web page, so that the server returns a first web page annotation and information of first annotation position in the target web page, where the first annotation position information is used to determine a display position of the first web page annotation in the target web page. When the terminal receives the first web page annotation and the first annotation position information, the terminal displays the first web page annotation on the target web page based on the first annotation position information. In the present disclosure, a web page annotation of a target web page is accurately positioned by using position information of the web page annotation, thereby avoiding the problem that a web page annotation may be incorrectly displayed when multiple pieces of same selected text information exist, and improving accuracy of displaying of the web page annotation.

In some embodiments, the terminal performs the aforementioned operations in a web browser application. In order for the server to keep track of annotations on the same web page by different users, the web browser application is uniquely associated with a user account. When the web browser application submits an annotation obtaining request, it includes the user account in the request such that the server can uniquely identify annotations made by different users. When the server returns annotations to the requesting terminal, the server may return only annotations associated with the user account and optionally annotations associated with other user accounts assuming that the other user accounts grants permission to view their annotations on the same web page.

When displaying the annotations on the target web page, the web browser application may dynamically render them one by one on the target web page in an animated manner. For example, annotations associated with the user account enter into the terminal's display from the right side while annotations associated with the other user accounts enter into the terminal's display from the left side so that the user of the terminal can appreciate roughly the source of each annotation. Alternatively, the annotations associated with the user account are displayed in a first visually distinguishable manner (e.g., showing the identifier of the user account next to each annotation) while the annotations associated with the other user accounts are displayed in a second visually distinguishable manner (e.g., using a different color from that of the annotations associated with the user account).

In some embodiments, the web browser application is built into or invoked by a social networking application for performing the aforementioned operations. For example, the social networking application supports an online chat group having multiple members and the content of the target web page is a topic of the chat group after one group member posts a link to the target web page in the form of a group message to the other group members. In order to share their thoughts about the target web page, each group member may click on the group message to open the target web page by invoking the web browser application from the social networking application. After rendering the target web page, the web browser application sends an annotation obtaining request to the server of the social networking application, requesting annotations posted by other group members in the past. As noted above, all the annotations will be dynamically displayed on the target web page, one by one, like a slide presentation, with each annotation highlighted and amplified for a predefined amount time (which can be fixed or varied based on the length of the annotation). At the end, the group member can add his or her own annotation to the target web page. Because the annotations are separately managed by the social networking application for a group of targeted users, this method can promote more focused discussions on the target web page without making any changes to the web page itself.

Optionally, the displaying the first web page annotation on the target web page based on the first annotation position information includes:

determining first selected text in the target web page based on selected area position information when the first annotation position information includes the selected area position information and first annotation box coordinates, where the first selected text is annotated by the first web page annotation, the selected area position information is used to determine a position of the first selected text in the target web page, the first annotation box coordinates are coordinates of a first annotation box on the target web page, and the first annotation box is an annotation box used to display the first web page annotation; and displaying the first web page annotation based on the position of the first selected text and the first annotation box coordinates.

Optionally, the displaying the first web page annotation on the target web page based on the first annotation position information includes:

determining a first selected picture in the target web page based on first index information when the first annotation position information includes first relative coordinates and the first index information, where the first selected picture is annotated by the first web page annotation, the first index information is index information of the first selected picture in the target web page, the first relative coordinates are relative coordinates of the first annotation box in the first selected picture, and the first annotation box is an annotation box used to display the first web page annotation; and displaying the first web page annotation in the first selected picture based on the first relative coordinates.

Optionally, after the displaying the first web page annotation on the target web page based on the first annotation position information, the method further includes:

displaying an annotation input box based on the trigger point coordinates of the specified event, where the trigger point coordinates are coordinates of a trigger point of the specified event on the target web page;

receiving a second web page annotation currently entered into the annotation input box;

determining second annotation position information when an instruction indicating that the second web page annotation is completed is received, where the second annotation position information is used to determine a display position of the second web page annotation; and sending a user account that is currently associated with the terminal, the identifier of the target web page, the second web page annotation, and the second annotation position information to the server, so that the server stores the second web page annotation and the second annotation position information based on the user account and the identifier of the target web page.

Optionally, the displaying an annotation input box based on trigger point coordinates of a specified event includes:

determining whether content of the target web page at the trigger point is text or a picture based on the trigger point coordinates of the specified event;

determining a target selected area based on the trigger point coordinates when the content of the target web page at the trigger point is text; and displaying the annotation input box based on a position of the target selected area.

Optionally, the determining a target selected area based on the trigger point coordinates includes:

determining target text information from the information content of the target web page based on the trigger point coordinates;

sending the target text information to the server, so that the server selects multiple text keywords from the target text information, and returns the multiple text keywords; and determining the target selected area based on the multiple text keywords after the multiple text keywords are received.

Optionally, the determining the target selected area based on the multiple text keywords includes:

selecting a recommended keyword from the multiple text keywords;

generating a recommended selected area based on the recommended keyword, where the recommended selected area is used to mark the recommended keyword; and adjusting the recommended selected area after an adjustment operation for the recommended selected area is detected, to obtain the target selected area.

Optionally, the determining second annotation position information includes:

determining selected area position information of the target selected area, and determining second annotation box coordinates, where the second annotation box coordinates are coordinates of the annotation input box on the target web page; and determining the selected area position information of the target selected area and the second annotation box coordinates as the second annotation position information.

Optionally, the determining second annotation position information includes:

determining a picture at the trigger point as a second selected picture when the information at the trigger point is the picture, where the second selected picture is annotated by the second web page annotation;

determining second relative coordinates based on the trigger point coordinates, where the second relative coordinates are relative coordinates of the trigger point in the second selected picture;

determining second index information, where the second index information is index information of the second selected picture on the target web page; and determining the second relative coordinates and the second index information as the second annotation position information.

All the foregoing optional technical solutions may be formed into optional embodiments of the present application in any combination, which are not enumerated herein.

Figure 2:
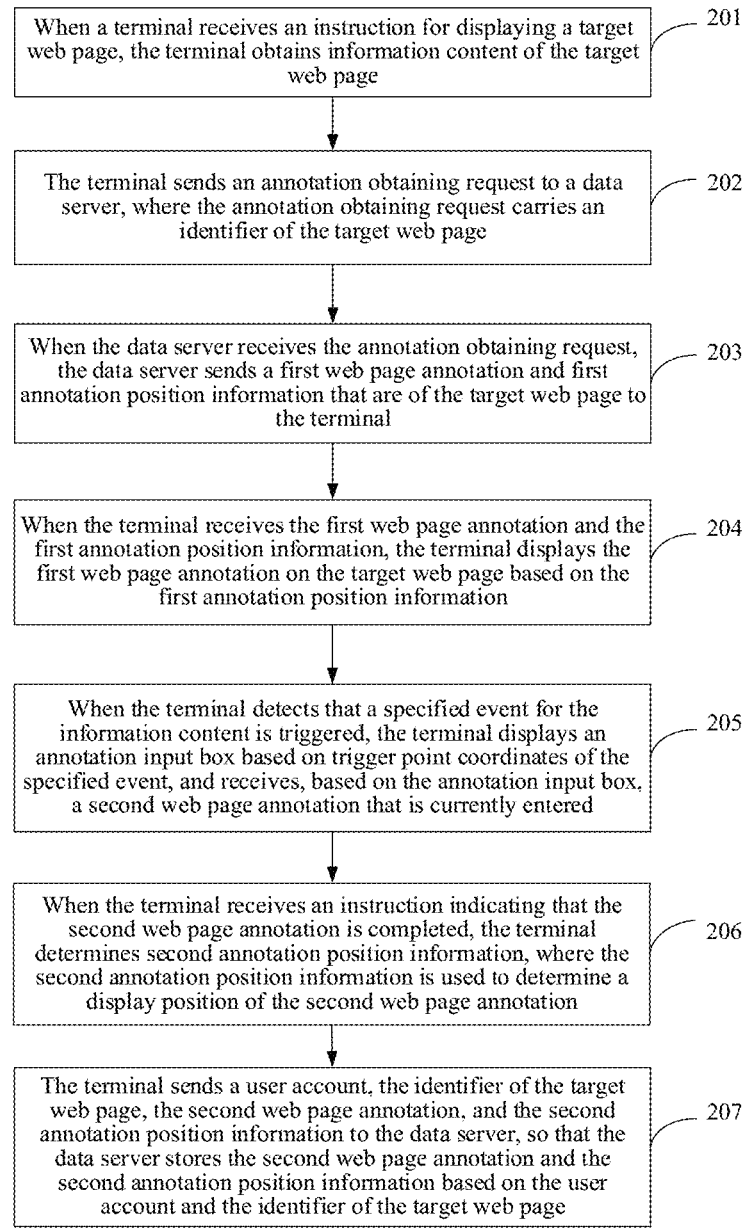
FIG. 2 is a flowchart of another web page annotation displaying method according to an embodiment of the present application.

FIG. 2 is a flowchart of a web page annotation displaying method according to an embodiment of the present application. Referring to FIG. 2, the method is applied to a terminal, and includes the following steps:

Step 201. When a terminal receives an instruction for displaying a target web page, the terminal obtains information content of the target web page.

Specifically, when the terminal receives the instruction for displaying the target web page, the terminal may generate a web page obtaining request based on an identifier of the target web page that is carried in the instruction for displaying the target web page, and send the web page obtaining request to a server. When the server receives the web page obtaining request, the server may obtain the information content of the target web page based on the identifier of the target web page, and send the information content of the target web page to the terminal. The terminal may receive the information content of the target web page, to obtain the information content of the target web page. Alternatively, when the terminal receives the instruction for displaying the target web page, the terminal may search a local cache for the information content of the target web page based on an identifier of the target web page that is carried in the instruction for displaying the target web page. When the terminal finds the information content of the target web page in the local cache, the terminal may obtain the information content of the target web page from the local cache. Certainly, in actual application, when the terminal receives the instruction for displaying the target web page, the terminal may also obtain the information content of the target web page in another manner. This is not specifically limited in this embodiment of the present application.

It should be noted that, when the terminal obtains the information content of the target web page, the terminal may directly display the information content of the target web page. Certainly, in actual application, the terminal may also not display the information content of the target web page, but directly perform the following steps 202 to 204 instead, and display the information content of the target web page together with a first web page annotation in step 204. This is not specifically limited in this embodiment of the present application. When the terminal displays the information content of the target web page, the terminal may render the information content in the form of the Hyper Text Markup Language (HTML) to display the information content. Certainly, in actual application, the terminal may also render the information content in another form to display the information content. This is also not specifically limited in this embodiment of the present application. The first web page annotation is content that is annotated on the target web page before a current time.

In addition, the instruction for displaying the target web page is used to display the target web page, and the instruction for displaying the target web page may be triggered by a user. The user may trigger the instruction by using a first specified operation. The first specified operation may be a tap operation, a slide operation, a voice operation, or the like. This is not specifically limited in this embodiment of the present application.

Further, the identifier of the target web page is used to uniquely identify the target web page, and the identifier of the target web page may be a title of the target web page, a website of the target web page, a key word of the target web page, or the like. This is not specifically limited in this embodiment of the present application.

After the terminal obtains the information content of the target web page, the terminal may display the first web page annotation of the target web page by using the method in the following steps 202 to 204, which are specifically as follows.

Step 202. The terminal sends an annotation obtaining request to the server, where the annotation obtaining request carries the identifier of the target web page.

When the terminal obtains the information content of the target web page, the terminal may generate the annotation obtaining request based on the identifier of the target web page, and send the annotation obtaining request to the server.

It should be noted that, the server is a server corresponding to an application program that is currently used to browse the target web page.

In addition, the annotation obtaining request is used to obtain the first web page annotation and information of first annotation position in the target web page. The first position information is used to determine a display position of the first web page annotation in the target web page. The first web page annotation not only may include a web page annotation corresponding to a user account currently logged on the terminal, but also may include a web page annotation corresponding to another user account than the user account. This is not specifically limited in this embodiment of the present application.

It should be noted that, the web page annotation corresponding to the user account currently logged on the terminal is a web page annotation annotated on the target web page by the user account, and the web page annotation corresponding to the another user account is a web page annotation annotated on the target web page by the another user account.

In addition, the user account currently logged on the terminal is a user account that is currently used to browse the target web page. The user account may be obtained by registering with the server, and the user account may include a character, a digit, or the like. This is not specifically limited in this embodiment of the present application.

For example, the identifier of the target web page is ID1. When the terminal obtains the information content of the target web page, the terminal may generate the annotation obtaining request based on the identifier ID1 of the target web page, and send the annotation obtaining request to the server.

It should further be noted that, to make it convenient for the server to determine the web page annotation corresponding to the user account currently logged on the terminal, the annotation obtaining request may further carry the user account currently logged on the terminal. This is not specifically limited in this embodiment of the present application.

Step 203. When the server receives the annotation obtaining request, the server sends the first web page annotation and the information of first annotation position in the target web page to the terminal.

When the server receives the annotation obtaining request, the server may obtain the first web page annotation and the first annotation position information of the target web page based on the identifier of the target web page carried in the annotation obtaining request, and send the first web page annotation and the first annotation position information of the target web page to the terminal.

Because the first web page annotation not only may include the web page annotation corresponding to the user account currently logged on the terminal, but also may include the web page annotation corresponding to the another user account than the user account, when the server obtains the first web page annotation, the server not only may obtain only the web page annotation corresponding to the user account currently logged on the terminal, but also may obtain the web page annotations corresponding to all the user accounts. Therefore, the operation of obtaining the first web page annotation and the first annotation position information of the target web page by the server based on the identifier of the target web page may include two cases, as described below.

In a first case, when the annotation obtaining request carries the user account currently logged on the terminal, the server obtains, from stored correspondences among user accounts, web page identifiers, web page annotations, and position information, the corresponding web page annotation and the corresponding position information based on the identifier of the target web page and the user account currently logged on the terminal, and determines the obtained web page annotation as the first web page annotation, and determines the obtained position information as the first annotation position information.

It should be noted that, the first web page annotation obtained in the first case includes only the web page annotation corresponding to the user account currently logged on the terminal. In this case, the server does not need to obtain the web page annotation corresponding to the another user account, thereby improving efficiency of obtaining the first web page annotation, and reducing a processing resource of the server.

For example, the annotation obtaining request carries the identifier of the target web page and the user account currently logged on the terminal, and the identifier of the target web page is ID1, and the user account is 12345678. In this case, the server may obtain, from correspondences among user accounts, web page identifiers, web page annotations, and position information shown in Table 1 below based on the identifier ID1 of the target web page and the user account 12345678, the corresponding web page annotation that is an annotation 1 and the corresponding position information that is information 1, and determine the annotation 1 as the first web page annotation, and determine the information 1 as the first annotation position information.

TABLE 1

| User account | Web page identifier | Web page annotation | Position information |
| --- | --- | --- | --- |
| 12345678 | ID1 | Annotation 1 | Information 1 |
|  | ID2 | Annotation 2 | Information 2 |
|  |  | Annotation 3 | Information 3 |
| ... | ... | ... | ... |
| 23456789 | ID1 | Annotation 4 | Information 4 |
|  | ID4 | Annotation 5 | Information 5 |
| ... | ... | ... | ... |

It should be noted that, in this embodiment of the present application, the correspondences among user accounts, web page identifiers, web page annotations, and position information shown in Table 1 above are only used as an example for description, and Table 1 above does not form a specific limitation to this embodiment of the present application.

In a second case, the server obtains, from stored correspondences among user accounts, web page identifiers, web page annotations, and position information based on the identifier of the target web page, the web page annotations and position information corresponding to all the user accounts, determines the obtained web page annotations as the first web page annotations, and determines the obtained position information as the first annotation position information.

It should be noted that, the first web page annotations obtained in the second case not only include the web page annotation corresponding to the user account currently logged on the terminal, but also include the web page annotation corresponding to the another user account than the user account. Therefore, after the server sends the first web page annotations to the terminal, it may be convenient for the user using the terminal to obtain all the web page annotations on the target web page in a timely manner.

For example, the annotation obtaining request carries the identifier of the target web page, and the identifier of the target web page is ID1. In this case, the server may obtain, from the correspondences among user accounts, web page identifiers, web page annotations, and position information shown in Table 1 above based on the identifier ID1 of the target web page, the corresponding web page annotations that are the annotation 1 and an annotation 4, and the corresponding position information that are the information 1 and information 4, determine the annotation 1 and the annotation 4 as the first web page annotations, determine the information 1 as the first annotation position information of the annotation 1, and determine the information 4 as the first annotation position information of the annotation 4.

Further, for the second case, because the web page annotations corresponding to all the user accounts are obtained, to make it convenient for the user using the terminal to identify, from the first web page annotations, the web page annotation corresponding to the user account currently logged on the terminal, the server may further perform account marking on the first web page annotations before sending the first web page annotations to the terminal, to make it convenient for the terminal to subsequently display the web page annotations based on the account marking.

The operation of performing account marking on the first web page annotations by the server may be as follows: The server marks the first web page annotations by using the user accounts corresponding to the first web page annotations. Alternatively, when the annotation obtaining request further carries the user account currently logged on the terminal, the server obtains, from the first web page annotations, the web page annotation corresponding to the user account currently logged on the terminal, marks the obtained web page annotation with a first mark, and marks, with a second mark, the web page annotation in the first web page annotations other than the web page annotation corresponding to the user account currently logged on the terminal. Certainly, in actual application, the server may also perform account marking on the first web page annotations in another manner. This is not specifically limited in this embodiment of the present application.

It should be noted that, the first mark is used to mark the web page annotation corresponding to the user account currently logged on the terminal, and the second mark is used to mark the web page annotation other than the web page annotation corresponding to the user account currently logged on the terminal.

Further, when the server receives the annotation obtaining request, in addition to sending the first web page annotation and the first annotation position information of the target web page to the terminal, if an annotated object corresponding to the first web page annotation is text information, the server may further send first selected text corresponding to the first web page annotation to the terminal, so that the terminal displays the first web page annotation based on the first annotation position information and the first selected text, thereby further improving accuracy of displaying of the web page annotation. The first selected text is text information annotated by the first web page annotation.

Step 204. When the terminal receives the first web page annotation and the first annotation position information, the terminal displays the first web page annotation on the target web page based on the first annotation position information.

When the terminal receives the first web page annotation and the first annotation position information, because the information content of the target web page not only may include text information, but also may include a picture. Therefore, the annotated object of the first web page annotation may also be text information or a picture. For different annotated objects, manners of determining the display position of the first web page annotation in the target web page are different to some extent. That is, for different annotated objects, content included in the first annotation position information is different. Therefore, the operation of displaying the first web page annotation on the target web page based on the first annotation position information may include two cases, as described below.

In a first case, when the first annotation position information includes selected area position information and first annotation box coordinates, the terminal determines the first selected text in the target web page based on the selected area position information, and displays the first web page annotation based on a position of the first selected text and the first annotation box coordinates.

It should be noted that, the selected area position information is used to determine the position of the first selected text in the target web page, and the selected area position information include a paragraph starting position and a paragraph ending position of the first selected text, and a starting character offset and an ending character offset of the first selected text.

In addition, the first annotation box coordinates are used to determine a position of the first annotation box on the target web page, and the first annotation box coordinates are coordinates of the first annotation box on the target web page. An origin of a coordinate system in which the first annotation box coordinates are located may be a position such as an upper left corner, a lower left corner, an upper right corner, or a lower right corner of the target web page. This is not specifically limited in this embodiment of the present application.

In addition, the first annotation box is an annotation box used to display the first web page annotation.

When the first annotation position information includes the selected area position information and the first annotation box coordinates, the terminal determines that the annotated object of the first web page annotation is text information. In this case, the terminal may determine the first selected text from the information content of the target web page based on the selected area position information. When the first annotation box coordinates are located at the position of the first selected text, the terminal may directly display the first web page annotation based on the first annotation box coordinates. When the first annotation box coordinates are not located at the position of the first selected text, the terminal may adjust the first annotation box coordinates based on the position of the first selected text, and display the first web page annotation based on the adjusted first annotation box coordinates.

When the terminal displays the first web page annotation based on the first annotation box coordinates, the terminal may display the first annotation box based on the first annotation box coordinates, and display the first web page annotation in the first annotation box.

When the terminal adjusts the first annotation box coordinates based on the position of the first selected text, the terminal may obtain coordinates of a position that is located right below a middle position of the first selected text and has a first specified length from the middle position of the first selected text, and replace the first annotation box coordinates with the obtained coordinates, to adjust the first annotation box coordinates. Certainly, the terminal may also adjust the first annotation box coordinates based on the position of the first selected text in another manner. This is not specifically limited in this embodiment of the present application.

It should be noted that, the first specified length may be set in advance. For example, the first specified length may be 0.5 cm (centimeter) or 1 cm. This is not specifically limited in this embodiment of the present application.

Further, to make it convenient for the user to learn the text information annotated by the first web page annotation in a timely manner, after the terminal determines the first selected text from the information content of the target web page, the terminal may further display the first selected text in highlight, and when the terminal displays the first selected text in highlight, the terminal may mark the first selected text with a particular symbol, or may mark the first selected text with a particular color. Certainly, in actual application, the terminal may also display the first selected text in highlight in another form. This is not specifically limited in this embodiment of the present application.

The particular symbol may be set in advance, and the particular symbol may be a wavy line, an underscore, a double underscore, a dashed line, or the like. This is not specifically limited in this embodiment of the present application. In addition, the particular color may also be set in advance. For example, the particular color may be blue, red, or the like. This is not specifically limited in this embodiment of the present application.

Figure 3:
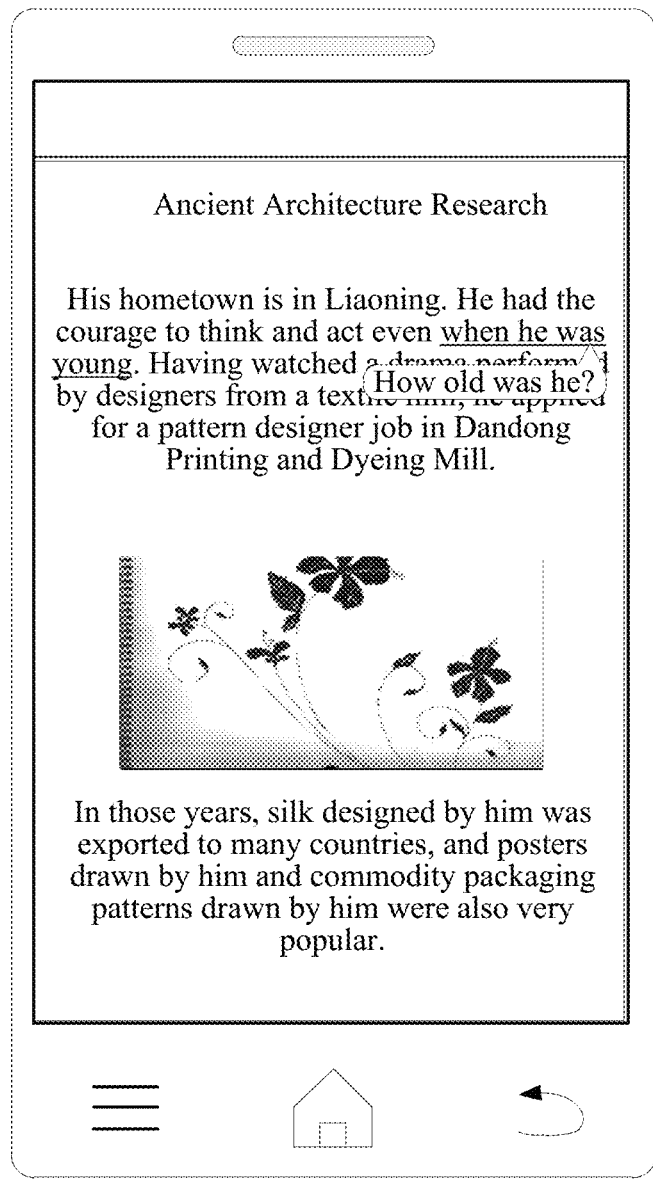
FIG. 3 is a diagram of a displaying interface of a first type of web page annotation displaying according to an embodiment of the present application.

For example, the selected area position information is position information 1, the first annotation box coordinates are coordinates 1, the first web page annotation is "How old was he?", and the particular symbol is an underscore. Therefore, the terminal may determine from the information content of the target web page based on the position information 1 that the first selected text is "when he was young", and mark the first selected text with an underscore. If the first annotation box coordinates are located at the position of the first selected text, the terminal may display the first annotation box based on the coordinates 1, and display the first web page annotation "How old was he?" in the first annotation box. A displaying interface thereof is shown in FIG. 3, which is a diagram of a displaying interface of a first type of web page annotation displaying according to an embodiment of the present application.

The operation of determining the first selected text from the information content of the target web page based on the selected area position information may be as follows: The terminal determines, based on the paragraph starting position and the paragraph ending position of the first selected text, a text paragraph in which the first selected text is located, and determines the first selected text from the text paragraph based on the starting character offset and the ending character offset of the first selected text.

It should be noted that, the paragraph starting position of the first selected text is a paragraph starting position of the text paragraph in which the first character of the first selected text is located, and the paragraph ending position of the first selected text is a paragraph ending position of the text paragraph in which the last character of the first selected text is located.

In addition, the starting character offset of the first selected text is an offset of the first character of the first selected text relative to the paragraph starting position of the text paragraph in which the first character is located, and the ending character offset of the first selected text is an offset of the last character of the first selected text relative to a paragraph starting position of the text paragraph in which the last character is located.

Because the text paragraph in which the first selected text is located may include one text paragraph, or may include multiple text paragraphs, methods for determining the first selected text are slightly different. Cases in which the text paragraph is one text paragraph and multiple text paragraphs are respectively explained below, as described below.

The terminal determines a first text paragraph based on the paragraph starting position of the first selected text, and determines a second text paragraph based on the paragraph ending position of the first text information. When the first text paragraph and the second text paragraph are a same text paragraph, the terminal determines that the text paragraph in which the first selected text is located is one text paragraph. In this case, the terminal determines, based on the paragraph starting position and the starting character offset of the first selected text, the first character in the text paragraph in which the first selected text is located, determines, based on the paragraph starting position and the ending character offset of the first selected text, the last character in the text paragraph in which the first selected text is located, and determines text information that is located between the first character and the last character and includes the first character and the last character as the first selected text.

When the first text paragraph and the second text paragraph are different text paragraphs, the terminal determines that the text paragraph in which the first selected text is located is multiple text paragraphs. In this case, the terminal determines, based on the paragraph starting position and the starting character offset of the first selected text, the first character of the first selected text in the first text paragraph included in the multiple text paragraphs, determines, based on the paragraph ending position of the first selected text, a paragraph starting position of the last text paragraph included in the multiple text paragraphs, determines, based on a paragraph starting position of the last text paragraph and the ending character offset, the last character of the first selected text in the last text paragraph included in the multiple text paragraphs, and determines text information that is located between the first character and the last character and includes the first character and the last character as the first selected text.

Figure 4A:
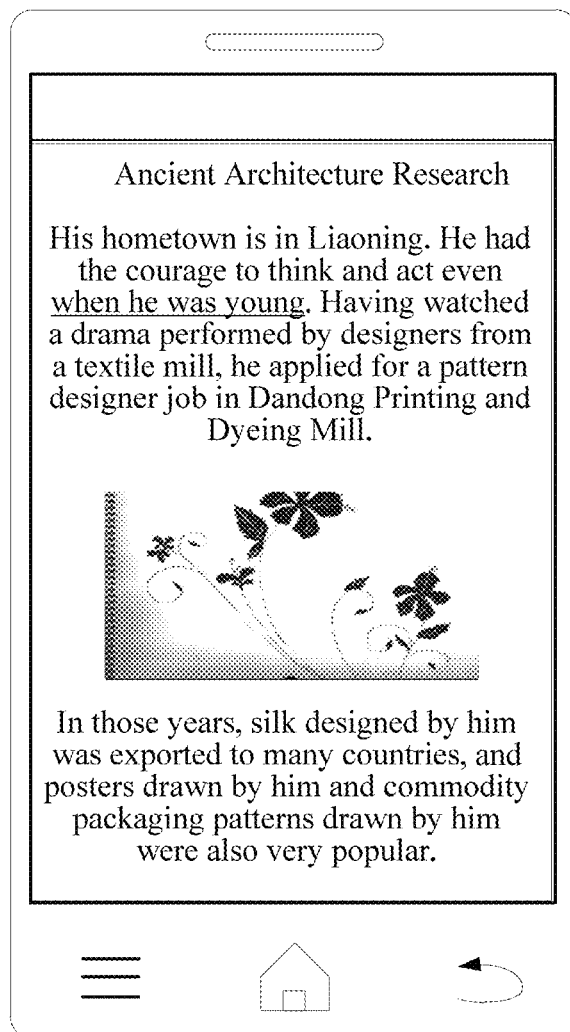
FIG. 4A is a diagram of a displaying interface of a second type of web page annotation displaying according to an embodiment of the present application.

For example, the paragraph starting position of the first selected text is a position 1, the paragraph ending position is a position 48, the starting character offset of the first selected text is 8, and the ending character offset of the first selected text is 10. The terminal determines, based on the paragraph starting position 1 and the paragraph ending position 48 of the first selected text, that the paragraph in which the first selected text is located is a same text paragraph, and the text paragraph is a first paragraph. Therefore, the terminal determines, based on the paragraph starting position 1 and the starting character offset 8 of the first selected text, that the first character of the first selected text in the first paragraph is the eighth character in the first paragraph, determines, based on the paragraph starting position 1 and the ending character offset 10 of the first selected text, that the last character of the first selected text in the first paragraph is the tenth character in the first paragraph. Therefore, the terminal determines that text information that is located between the eighth character and the tenth character in the first paragraph and includes the eighth character and the tenth character is "when he is young", as shown in FIG. 4A, which is a diagram of a displaying interface of a second type of web page annotation displaying according to an embodiment of the present application, and determines the text information as the first selected text.

Figure 4B:
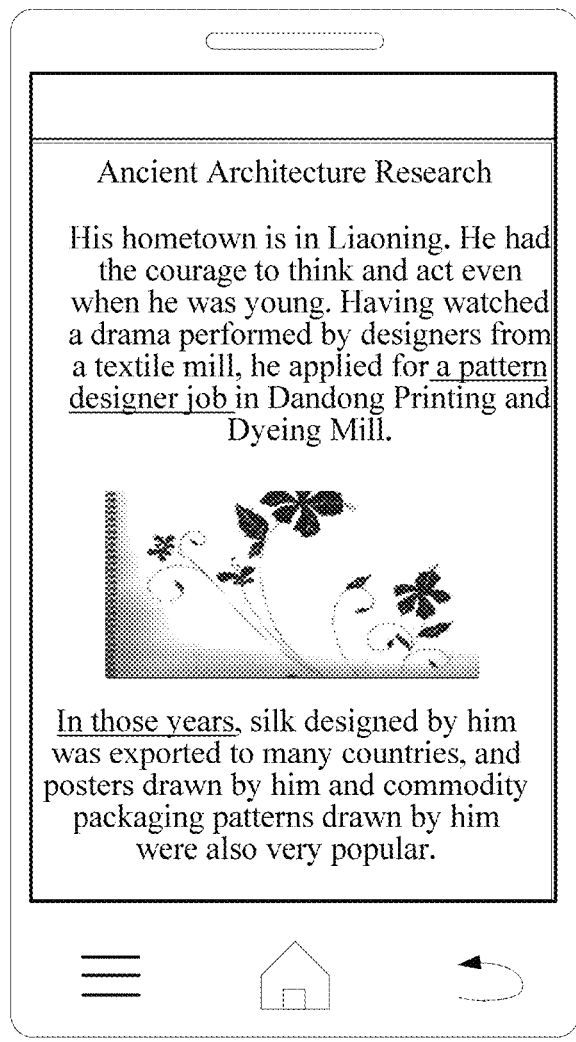
FIG. 4B is a diagram of a displaying interface of a third type of web page annotation displaying according to an embodiment of the present application.

For another example, the paragraph starting position of the first selected text is the position 1, the paragraph ending position is a position 82, the starting character offset of the first selected text is 42, and the ending character offset of the first selected text is 2. The terminal determines, based on the paragraph starting position 1 and the paragraph ending position 82 of the first selected text, that the paragraph in which the first selected text is located is multiple text paragraphs, and the multiple text paragraphs are a first paragraph and a second paragraph. Therefore, the terminal determines, based on the paragraph starting position 1 and the starting character offset 42 of the first selected text, that the first character of the first selected text in the first text paragraph included in the multiple text paragraphs, that is, the first paragraph, is the $42^{ed}$ character in the first paragraph, determines, based on the paragraph ending position 82 of the first selected text, that the paragraph starting position of the last paragraph included in the multiple paragraphs, that is, the second paragraph, is 49, and determines, based on the paragraph starting position 49 of the second paragraph and the ending character offset 2, that the last character of the first selected text in the second paragraph is the second character in the second paragraph. Therefore, the terminal determines that text information that is located between the $42^{ed}$ character in the first paragraph and the second character in the second paragraph and includes the $42^{ed}$ character in the first paragraph and the second character in the second paragraph is "a pattern designer job. In those years", as shown in FIG. 4(b), which is a diagram of a displaying interface of a third type of web page annotation displaying according to an embodiment of the present application, and determines the text information as the first selected text.

In a second case, when the first annotation position information includes first relative coordinates and first index information, the terminal determines a first selected picture in the target web page based on the first index information. The first selected picture is annotated by the first web page annotation. The first index information is index information of the first selected picture in the target web page. The first web page annotation is displayed in the first selected picture based on the first relative coordinates.

Because each picture in the target web page has corresponding index information, and index information corresponding to each picture is different, when the first annotation position information includes the first relative coordinates and the first index information, the terminal may determine the first selected picture from the information content of the target web page based on the first index information, and display the first web page annotation in the first selected picture based on the first relative coordinates.

When the terminal displays the first web page annotation in the first selected picture based on the first relative coordinates, the terminal may display the first annotation box in the first selected picture based on the first relative coordinates, and display the first web page annotation in the first annotation box.

Figure 5:
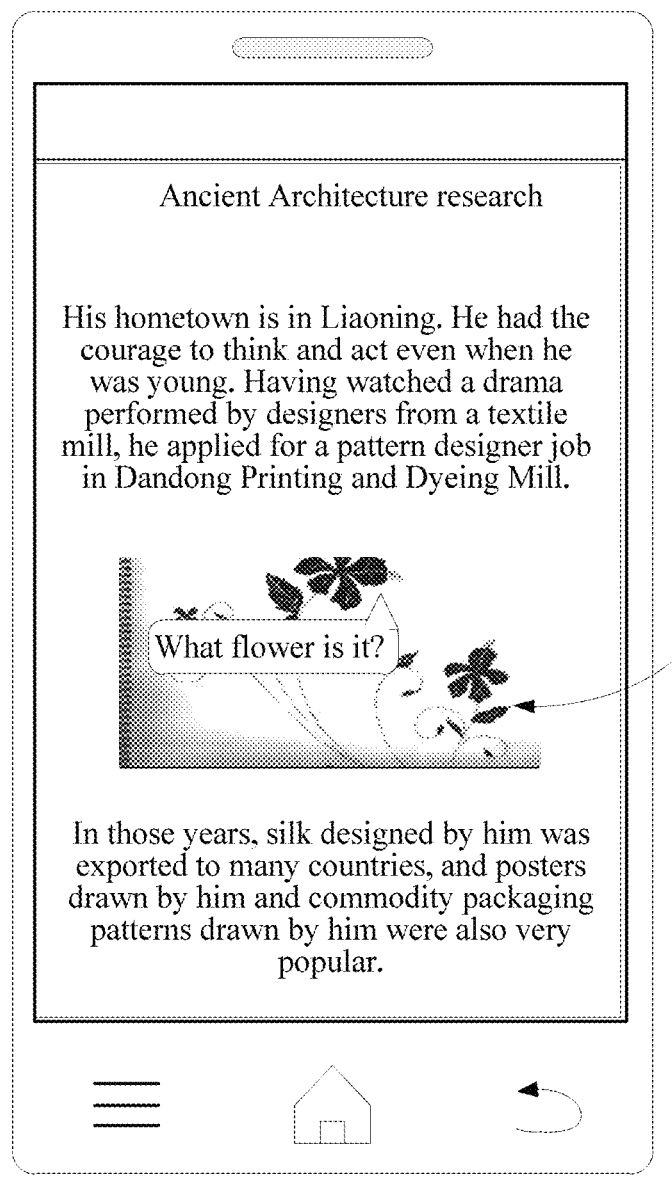
FIG. 5 is a diagram of a displaying interface of a fourth type of web page annotation displaying according to an embodiment of the present application.

For example, the first relative coordinates are coordinates 2, the first index information is index information 1, and the first web page annotation is "What flower is it?". The terminal determines from the information content of the target web page based on the index information 1 that the first selected picture is a picture 1, displays the first annotation box in the picture 1 based on the first relative coordinates, and displays the first web page annotation "What flower is it?" in the first annotation box. A displaying interface thereof is shown in FIG. 5, which is a diagram of a displaying interface of a fourth type of web page annotation displaying according to an embodiment of the present application.

It should be noted that, the first relative coordinates are used to determine a position of the first annotation box in the first selected picture, and the first relative coordinates are relative coordinates of the first annotation box in the first selected picture. An origin of a coordinate system in which the first relative coordinates are located may be a position such as an upper left corner, a lower left corner, an upper right corner, or a lower right corner of the first selected picture. This is not specifically limited in this embodiment of the present application.

Further, when the terminal not only receives the first web page annotation and the first annotation position information of the target web page that are sent by server, but also receives first selected text corresponding to the first web page annotation that is sent by the server, to avoid the problem that the first web page annotation is incorrectly displayed when the information content of the target web page changes, the terminal may further search the target web page for the position of the first selected text by using the first selected text, and determine whether found positions include the position identified by the first annotation position information. If the found positions include the position identified by the first annotation position information, the terminal displays the first web page annotation near the first selected text at the position identified by the first annotation position information. If the found positions do not include the position identified by the first annotation position information, the terminal determines that the first selected text corresponding to the first web page annotation has changed. In this case, the terminal may not display the first web page annotation.

Further, when account marking is performed on the first web page annotations by the server, the terminal may further display the first web page annotations based on the account marking, to make it convenient for the user to identify, from the first web page annotations, the web page annotation corresponding to the user account currently logged on the terminal. The operation of displaying the first web page annotations based on the account marking may be as follows: When the first web page annotation are marked in the first account marking manner in the foregoing step 203, that is, the first web page annotations are marked by the server by using the user accounts corresponding to the first web page annotations, the terminal may display the first web page annotations based on the user accounts corresponding to the first web page annotations. When the first web page annotations are marked in the second account marking manner in the foregoing step 203, that is, the first web page annotations are marked by the server by using the first mark or the second mark, the terminal may display, in a first specified color, the first web page annotation marked with the first mark, and display, in a second specified color, the first web page annotation marked with the second mark. Certainly, in actual application, the terminal may also display the first web page annotations based on the account marking in another manner. This is not specifically limited in this embodiment of the present application.

It should be noted that, the first specified color and the second specified color are different, and the first specified color and the second specified color may both be set in advance. This is not specifically limited in this embodiment of the present application.

When the terminal displays the first web page annotations based on the user accounts corresponding to the first web page annotations, the terminal may display the first web page annotations by using colors corresponding to the user accounts. Certainly, in actual application, the terminal may also display the first web page annotations based on the user accounts corresponding to the first web page annotations in another manner. This is not specifically limited in this embodiment of the present application.

It should be noted that, after the terminal displays the first web page annotations based on the user accounts corresponding to the first web page annotations, when the terminal detects a tap operation on the first web page annotation, the terminal may further display the user account, so that the user can learn the user account corresponding to the first web page annotation in a timely manner. The tap operation may be triggered by the user. This is not specifically limited in this embodiment of the present application.

Further, after the terminal displays the first web page annotation, if the terminal detects that the user triggers a first specified operation, the terminal may further hide the first web page annotation. After the first web page annotation is hidden, when the terminal detects again that the user triggers the first specified operation, the terminal may further display the first web page annotation again, thereby making displaying of the first web page annotation more flexible.

Optionally, after the terminal displays the first web page annotation, when the terminal detects a feedback operation for the first web page annotation, the terminal may process the feedback for the first web page annotation. When the first web page annotation not only includes the web page annotation corresponding to the user account currently logged on the terminal, but also includes the web page annotation corresponding to the another user account than the user account, the feedback operation may be used to implement interaction among multiple users.

The feedback operation is used to perform feedback on the first web page annotation, and the feedback operation may include a like operation, a comment operation, or the like. This is not specifically limited in this embodiment of the present application. In addition, the feedback operation may be triggered by the user, and the user may trigger the feedback operation by tapping a like button, a comment button, or the like. This is not specifically limited in this embodiment of the present application.

It should be noted that, the like button and the comment button may be set in advance, and specific positions of the like button and the comment button are not specifically limited in this embodiment of the present application.

It should be noted that, after the terminal receives the instruction for displaying the target web page, the terminal may display the first web page annotation on the target web page by using the foregoing steps 201 to 204. After the first web page annotation is displayed, the user may further enter a new web page annotation on the target web page, and the newly entered web page annotation may be referred to as a second web page annotation, and the terminal may annotate the target web page with the second web page annotation by using the method in the following steps 205 to 207.

Step 205. When the terminal detects that a specified event for the information content is triggered, the terminal displays an annotation input box based on trigger point coordinates of the specified event, and receives, based on the annotation input box, the second web page annotation that is currently input.

When the terminal detects that the specified event for the information content is triggered, the terminal may obtain the trigger point coordinates of the specified event, and display the annotation input box based on trigger point coordinates of the specified event, where the annotation input box is used to input the second web page annotation. After displaying the annotation input box, the terminal may receive the currently input second web page annotation based on the annotation input box.

It should be noted that, the specified event is used to annotate the target web page with the second web page annotation, and the specified event may be triggered by the user. The specified event may be a long-press event, a double-tap event, or the like. This is not specifically limited in this embodiment of the present application.

In addition, the trigger point coordinates are used to determine a position of a trigger point of the specified event on the target web page, and the trigger point coordinates are coordinates of the trigger point of the specified event on the target web page. An origin of a coordinate system in which the trigger point coordinates are located may be a position such as an upper left corner, a lower left corner, an upper right corner, or a lower right corner of the target web page. This is not specifically limited in this embodiment of the present application.

When the terminal detects that the specified event for the information content is triggered, the operation of displaying the annotation input box based on the trigger point coordinates of the specified event may include steps (1) to (4), as described below.

(1) The terminal judges whether information at the trigger point is text information or a picture based on the trigger point coordinates of the specified event.

The terminal selects, based on the trigger point coordinates of the specified event from multiple areas included in the target web page, an area in which the trigger point coordinates are located, and obtains a corresponding information attribute from stored correspondences between the areas of the target web page and information attributes based on the selected area. When the information attribute is a text attribute, the terminal determines that the information at the trigger point is text information, and when the information attribute is a picture attribute, the terminal determines that the information at the trigger point is a picture.

It should be noted that, the multiple areas included in the target web page may be divided in advance, and a quantity of the multiple areas is not specifically limited in this embodiment of the present application.

For example, the trigger point coordinates are coordinates 3, and an area corresponding to the coordinates 3 is an area 1. The terminal selects, based on the coordinates 3 of the specified event from the multiple areas included in the target web page, the area in which the trigger point coordinates are located that is the area 1, and obtains, based on the area 1 from the correspondences between the areas of the target web page and the information attributes shown in Table 2 below, that the corresponding information attribute is a text. Therefore, the terminal determines that the information at the trigger point is text information.

TABLE 2

| Area | Information attribute |
|---|---|
| Area 1 | Text |
| Area 2 | Image |
| Area 3 | Text |
| ... | ... |

It should be noted that, in this embodiment of the present application, the correspondences between the areas and the information attributes shown in Table 2 above are only used as an example for description, and Table 2 above does not form a specific limitation to this embodiment of the present application.

(2) When the information at the trigger point is text information, the terminal determines a target selected area based on the trigger point coordinates.

When the information at the trigger point is text information, the terminal determines target text information from the information content of the target web page based on the trigger point coordinates, and sends the target text information to the server. When the server receives the target text information, the server selects multiple text keywords from the target text information, and sends the multiple text keywords to the terminal. When the terminal receives the multiple text keywords, the terminal determines the target selected area based on the multiple text keywords.

When the terminal determines the target text information from the information content of the target web page based on the trigger point coordinates, the terminal not only may determine text information between two punctuation marks immediately before and after the trigger point coordinates as the target text information, but also may determine first quantities of characters immediately before and after the trigger point coordinates as the target text information. Certainly, in actual application, the terminal may also determine the target text information by using another method. This is not specifically limited in this embodiment of the present application.

It should be noted that, the first specified quantity may be set in advance. For example, the first specified quantity may be 2, 3, 4, or the like. This is not specifically limited in this embodiment of the present application.

Figure 6:
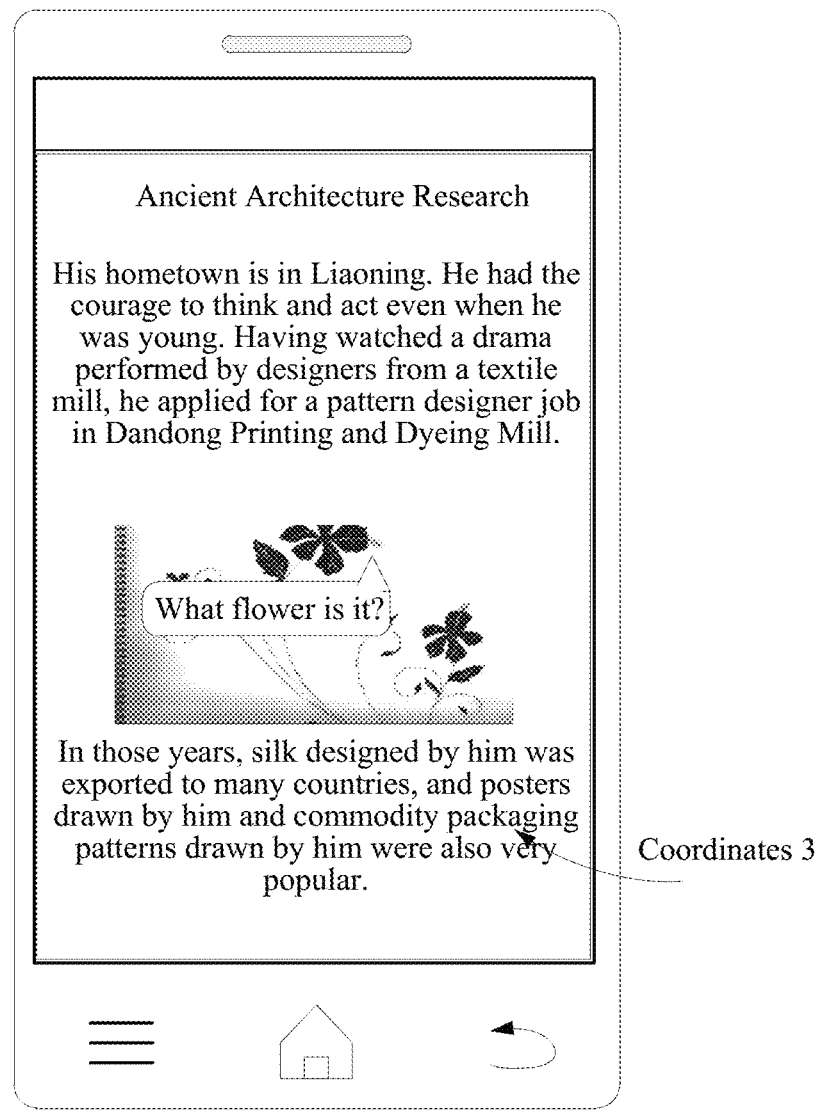
FIG. 6 is a diagram of a displaying interface of a fifth type of web page annotation displaying according to an embodiment of the present application.

For example, the trigger point coordinates is coordinates 3. When the terminal determines the text information between the two punctuation marks immediately before and after the trigger point coordinates as the target text information, as shown in FIG. 6, which is a diagram of a displaying interface of a fifth type of web page annotation displaying according to an embodiment of the present application, the terminal determines, based on the coordinates 3, text information "posters drawn by him and commodity packaging patterns drawn by him were also very popular" between two punctuation marks immediately before and after the trigger point coordinates 3 in the information content of the target web page as the target text information.

In addition, when the server receives the target text information, the operation of selecting the multiple text keywords from the target text information by the server may be as follows: The server performs segmentation on the target text information, obtains multiple phrases, and selects the multiple text keywords from the multiple phrases.

When the server selects the multiple text keywords from the multiple phrases, the server may select, from the multiple phrases, phrases that are most frequently used. That is, the server obtains, from stored correspondences between phases and use frequencies, use frequencies of the multiple phrases according to the multiple phrases, select a second specified quantity of phrases according to the use frequencies of the multiple phrases in descending order, and determine the selected phrases as the text keywords. Certainly, in actual application, the server may also select the multiple text keywords from the multiple phrases in another manner. This is not specifically limited in this embodiment of the present application.

It should be noted that, the second specified quantity may be set in advance. For example, the first specified quantity may be 2, 3, 5, or the like. This is not specifically limited in this embodiment of the present application.

For example, the second specified quantity is 3. When the server receives the target text information, the server performs segmentation on the target text information, and obtains multiple phrases that are "draw", "poster", "commodity packaging pattern", and "popular". The server obtains, from correspondences between phases and use frequencies shown in Table 3 below, use frequencies of the multiple phrases based on the multiple phrases. A use frequency of "draw" is 40, a use frequency of "poster" is 72, a use frequency of "commodity packaging pattern" is 80, and a use frequency of "popular" is 100. The terminal selects three phrases that are "poster", "commodity packaging pattern", and "popular" according to the use frequencies of the multiple phrases in descending order, and determines the selected "poster", "commodity packaging pattern", and "popular" as the text keywords.

TABLE 3

| Phrase | Use frequency |
|---|---|
| Draw | 40 |
| Poster | 72 |
| Commodity packaging pattern | 80 |
| Popular | 100 |
| ... | ... |

It should be noted that, in this embodiment of the present application, the correspondences between the phrases and the information use frequencies shown in Table 3 above are only used as an example for description, and Table 3 above does not form a specific limitation to this embodiment of the present application.

Further, when the terminal determines the target selected area based on the multiple text keywords, the terminal may select a recommended keyword from the multiple text keywords based on the trigger point coordinates, and generate a recommended selected area based on the recommended keyword. The recommended selected area is used to mark the recommended keyword, and the recommended selected area may be adjusted. When the terminal detects an adjustment operation for the recommended selected area, the terminal adjusts the recommended selected area, to obtain the target selected area. Certainly, in actual application, the terminal may also determine the target selected area based on the multiple text keywords in another manner. This is not specifically limited in this embodiment of the present application.

It should be noted that, the adjustment operation is used to adjust the recommended selected area, and the adjustment operation may be triggered by the user. The user may trigger the adjustment operation by using adjustment buttons on left and right sides of the recommended selected area. Certainly, in actual application, the user may also trigger the adjustment operation in another form. This is not specifically limited in this embodiment of the present application.

Figure 7:
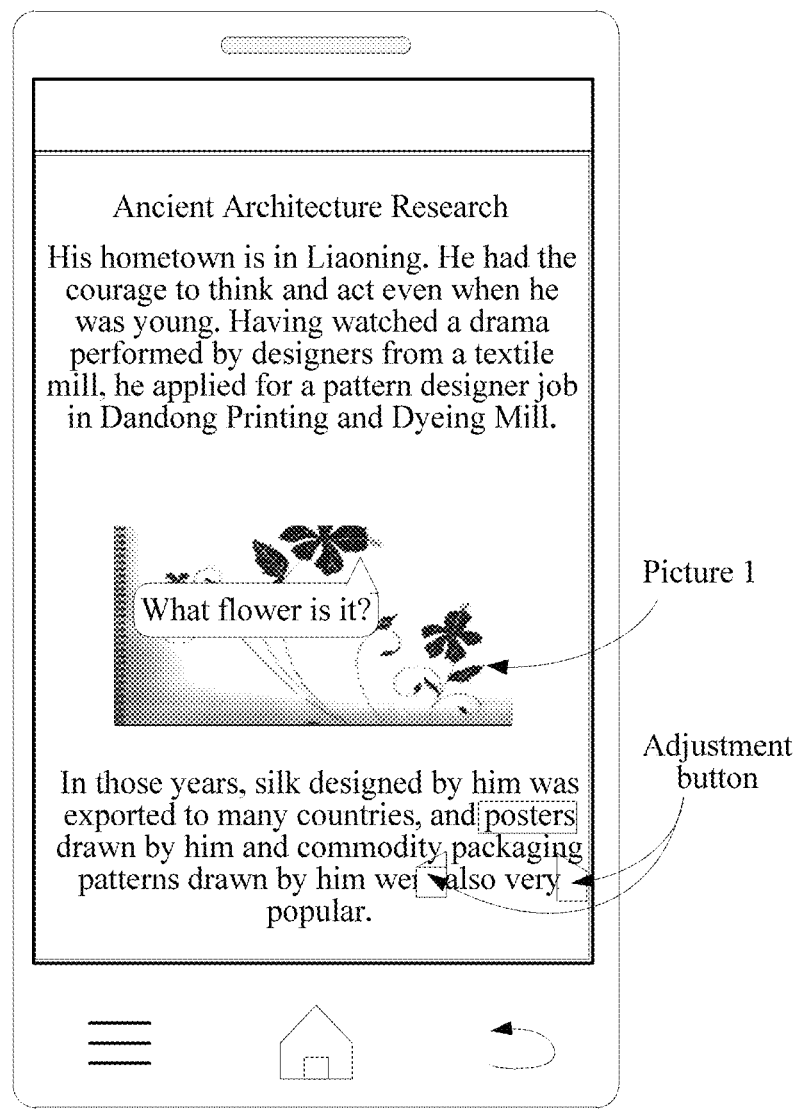
FIG. 7 is a diagram of a displaying interface of a sixth type of web page annotation displaying according to an embodiment of the present application.
Figure 8:
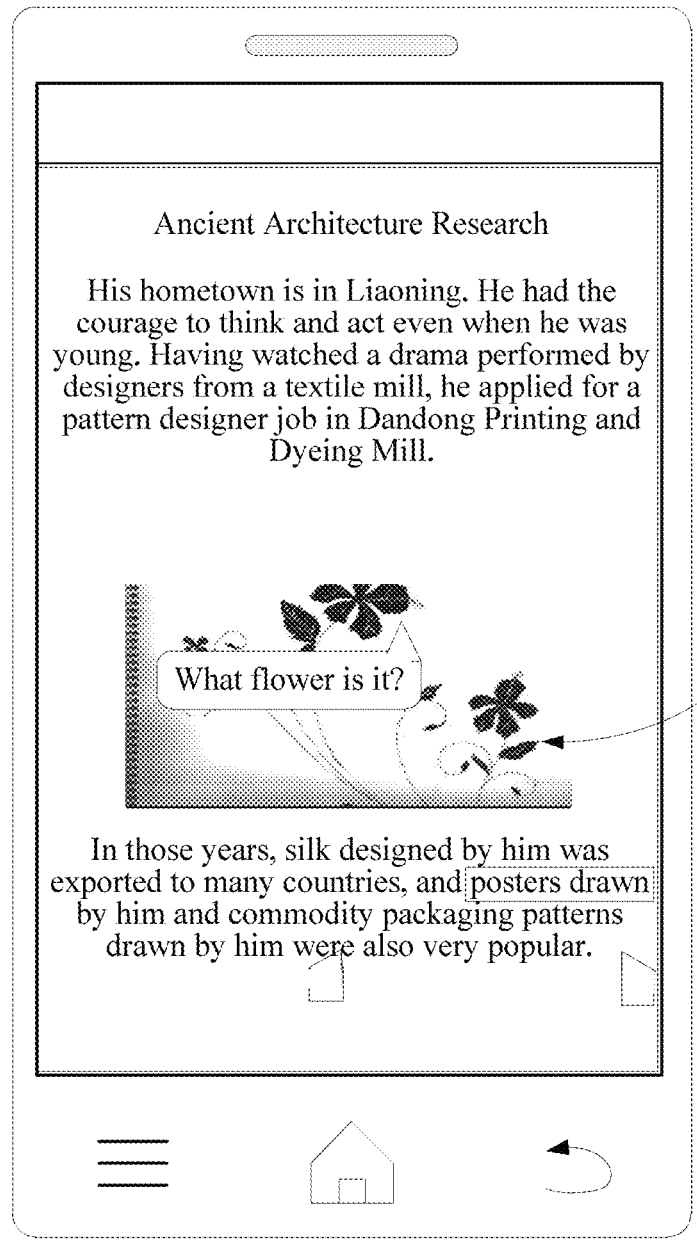
FIG. 8 is a diagram of a displaying interface of a seventh type of web page annotation displaying according to an embodiment of the present application.

For example, when the multiple text keywords received by the terminal are "poster", "commodity packaging pattern", and "popular", the terminal selects the recommended keyword from the multiple text keywords based on the trigger point coordinates, where it is assumed that the recommended keyword is "poster", and generates the recommended selected area as shown in FIG. 7, which is a diagram of a displaying interface of a sixth type of web page annotation displaying according to an embodiment of the present application, based on the recommended keyword "poster". The recommended selected area is used to mark the recommended keyword "poster", and adjustment buttons are included on left and right sides of the recommended selected area. When the terminal detects an adjustment operation of extending the adjustment button on the left side of the recommended selected area to the left, the terminal extends the recommended selected area to the left, obtaining the target selected area shown in FIG. 8, which is a diagram of a displaying interface of a seventh type of web page annotation displaying according to an embodiment of the present application.

When the terminal selects the recommended keyword from the multiple text keywords, the terminal may determine a keyword closest to the trigger point coordinates in the multiple text keywords as the recommended keyword. Certainly, in actual application, the terminal may also select the recommended keyword from the multiple text keywords in another manner. This is not specifically limited in this embodiment of the present application.

Further, after the terminal determines the target selected area based on the trigger point coordinates, to make it convenient for the user to learn text information included in the target selected area in a timely manner, the terminal may further display the text information included in the target selected area in highlight. There may be multiple colors for the highlight displaying, and the multiple colors may be arbitrarily selected, for example, red, yellow, and green. This is not specifically limited in this embodiment of the present application. Alternatively, the terminal may display the text information included in the target selected area in highlight. The operation of the highlight displaying is similar to the highlight displaying operation in the foregoing step 204. Details are not described again in this embodiment of the present application.

(3) The terminal displays the annotation input box based on a position of the target selected area.

After the terminal determines the target selected area, the terminal may obtain the position of the target selected area, and set a display position of the annotation input box based on the position of the target selected area. Then, the terminal displays the annotation input box based on the set display position.

When the terminal sets the display position of the annotation input box based on the position of the target selected area, the terminal may determine a position that is located right below the position of the target selected area and has a second specified length from the position of the target selected area as the display position of the annotation input box. Certainly, in actual application, the terminal may also set the display position of the annotation input box based on the position of the target selected area in another manner. This is not specifically limited in this embodiment of the present application.

It should be noted that, the second specified length may be set in advance. For example, the second specified length may be 0.5 cm (centimeter) or 1 cm. This is not specifically limited in this embodiment of the present application.

(4) When the information at the trigger point is a picture, the terminal displays the annotation input box based on the position at which the trigger point is located.

When the terminal displays the annotation input box based on the position at which the trigger point is located, the terminal may determine the position at which the trigger point is located as the display position of the annotation input box, and then display the annotation input box based on the display position of the annotation input box.

Step 206. When the terminal receives an instruction indicating that the second web page annotation is completed, the terminal determines second annotation position information, where the second annotation position information is used to determine a display position of the second web page annotation.

Because the information at the trigger point may be text information or a picture, when the terminal receives the instruction indicating that the second web page annotation is completed, the terminal may determine the second annotation position information in two manners, as described below.

In a first manner, when the content of the target web page at the trigger point is text, if the terminal receives the instruction indicating that the second web page annotation is completed, the terminal may determine the selected area position information of the target selected area, determine second annotation box coordinates, and determine the selected area position information of the target selected area and the second annotation box coordinates as the second annotation position information.

It should be noted that, the second annotation box coordinates are used to determine a position of the annotation input box on the target web page, and the second annotation box coordinates are coordinates of the annotation input box on the target web page. An origin of a coordinate system in which the second annotation box coordinates are located may be a position such as an upper left corner, a lower left corner, an upper right corner, or a lower right corner of the target web page. This is not specifically limited in this embodiment of the present application.

In addition, the instruction indicating that the second web page annotation is completed is used to indicate that inputting of content of the second web page annotation is completed, and the instruction indicating that the second web page annotation is completed may be triggered by the user. The user may trigger the instruction by using a second specified operation. The second specified operation may be an operation such as tapping an enter button or tapping a send button. This is not specifically limited in this embodiment of the present application.

When the terminal determines the second annotation box coordinates, the terminal may obtain the coordinates of the annotation input box on the target web page, and determine the coordinates of the annotation input box on the target web page as the second annotation box coordinates.

It should be noted that, the text information included in the target selected area is text information annotated by the second web page annotation. In this case, the text information included in the target selected area may be referred to as second selected text information. Because a text paragraph in which the second selected text information is located may include one text paragraph, or may include multiple text paragraphs, when the text paragraph in which the second selected text information is located includes one text paragraph or multiple text paragraphs, methods for determining the selected area position information of the target selected area by the terminal are slightly different, as described below.

When the text paragraph in which the second selected text information is located is one text paragraph, the terminal obtains a paragraph starting position and a paragraph ending position of the text paragraph in which the second selected text information is located, determines the obtained paragraph starting position as a paragraph starting position of the second selected text information, and determines the obtained paragraph ending position as a paragraph ending position of the second selected text information. Then, the terminal obtains a first character offset of the first character of the second selected text information relative to the paragraph starting position, determines the first character offset as a starting character offset, obtains a second character offset of the last character of the second selected text information relative to the paragraph starting position, determines the second character offset as an ending character offset, and determines the paragraph starting position, the paragraph ending position, the starting character offset, and the ending character offset of the second selected text information as the selected area position information of the target selected area.

When the text paragraph in which the second selected text information is located is multiple text paragraphs, the terminal obtains a paragraph starting position of the first text paragraph included in the multiple text paragraphs and a paragraph ending position of the last text paragraph included in the multiple text paragraphs, determines the obtained paragraph starting position as a paragraph starting position of the second selected text information, and determines the obtained paragraph ending position as a paragraph ending position of the second selected text information. Then, the terminal obtains a third character offset of the first character of the second selected text information relative to the paragraph starting position, determines the third character offset as a starting character offset, obtains a paragraph starting position of the last text paragraph in the multiple text paragraphs based on the paragraph ending position, obtains a fourth character offset of the last character of the second selected text information relative to the paragraph starting position of the last text paragraph, and determines the fourth character offset as an ending character offset. Then, the terminal determines the paragraph starting position, the paragraph ending position, the starting character offset, and the ending character offset of the second selected text information as the selected area position information of the target selected area.

In a second manner, when the information at the trigger point is a picture, the picture at the trigger point is determined as a second selected picture. The second selected picture is annotated by the second web page annotation. If the terminal receives the instruction indicating that the second web page annotation is completed, the terminal may determine second relative coordinates based on the trigger point coordinates, where the second relative coordinates are relative coordinates of the trigger point in the second selected picture; determine second index information, where the second index information is index information of the second selected picture on the target web page; and determine the second relative coordinates and the second index information as the second annotation position information.

After the terminal annotates the target web page with the second web page annotation by using the foregoing step 205 and step 206, the terminal may display the second web page annotation. In addition, in this embodiment of the present application, the terminal may further perform web page annotation again on selected text information or a selected picture that has been annotated on the target web page, thereby avoiding the problem in related technologies that a user cannot perform web page annotation at a same position again. In addition, the terminal may further combine and display multiple web page annotations that are located at a same position, thereby improving effects of displaying of the web page annotations.

Step 207. The terminal sends the user account, the identifier of the target web page, the second web page annotation, and the second annotation position information to the server, so that the server stores the second web page annotation and the second annotation position information based on the user account and the identifier of the target web page.

The terminal sends the user account, the identifier of the target web page, the second web page annotation, and the second annotation position information to the server. When the server receives the user account, the identifier of the target web page, the second web page annotation, and the second annotation position information, the server stores the second web page annotation and the second annotation position information in correspondences among user accounts, web page identifiers, web page annotations, and position information based on the user account and the identifier of the target web page, to update the correspondences among user accounts, web page identifiers, web page annotations, and position information. Certainly, in actual application, the server may also store the second web page annotation and the second annotation position information based on the user account and the identifier of the target web page in another manner. This is not specifically limited in this embodiment of the present application.

For example, the second web page annotation is an annotation 6, and the second annotation position information is information 6. The terminal sends the user account 12345678, the identifier ID1 of the target web page, the annotation 6, and the information 6 to the server. When the server receives the user account 12345678, the identifier ID1 of the target web page, the annotation 6, and the information 6, the server stores the annotation 6 and the information 6 in correspondences among user accounts, web page identifiers, web page annotations, and position information shown in Table 4 below based on the user account 12345678 and the identifier ID1 of the target web page, to update the correspondences among user accounts, web page identifiers, web page annotations, and position information shown in Table 1 above.

TABLE 4

| User account | Web page identifier | Web page annotation | Position information |
|---|---|---|---|
| 12345678 | ID1 | Annotation 1 | Information 1 |
|  |  | Annotation 6 | Information 6 |
|  | ID2 | Annotation 2 | Information 2 |
|  |  | Annotation 3 | Information 3 |
|  | ... | ... | ... |
| 23456789 | ID3 | Annotation 4 | Information 4 |
|  | ID4 | Annotation 5 | Information 5 |
|  | ... | ... | ... |

It should be noted that, in this embodiment of the present application, the correspondences among user accounts, web page identifiers, web page annotations, and position information shown in Table 4 above are only used as an example for description, and Table 4 above does not form a specific limitation to this embodiment of the present application.

Further, when an annotated object of the second web page annotation is text information, in addition to sending the user account, the identifier of the target web page, the second web page annotation, and the second annotation position information to the server, the terminal may further send the second selected text information corresponding to the second web page annotation to the server, so that the server stores the second web page annotation, the second annotation position information, and the second selected text information based on the user account and the identifier of the target web page.

Further, after annotating the target web page with the second web page annotation by using the foregoing steps 205 to 207, when the terminal detects a feedback operation for the second web page annotation, the terminal may process the feedback for the second web page annotation. When the terminal detects a delete operation for the second web page annotation, the terminal may further delete the second web page annotation.

The delete operation may be triggered by the user, and the user may trigger the delete operation by tapping a delete button or the like. This is not specifically limited in this embodiment of the present application. The delete button may be set in advance, and a specific position of the delete button is not specifically limited in this embodiment of the present application.

In this embodiment of the present application, when a terminal receives an instruction for displaying a target web page, the terminal obtains information content of the target web page, and sends an annotation obtaining request to a server, so that the server returns a first web page annotation and information of first annotation position in the target web page. When the terminal receives the first web page annotation and the first annotation position information, the terminal displays the first web page annotation on the target web page based on the first annotation position information. In this way, accurate positioning is achieved for displaying of the first web page annotation, the problem that a web page annotation may be incorrectly displayed when multiple pieces of same selected text information exist is avoided, and accuracy of displaying of the web page annotation is improved. In addition, the first web page annotation displayed by the terminal not only may include a web page annotation corresponding to a user account currently logged on the terminal, but also may include web page annotations corresponding to other user accounts than the user account, so that different users can view web page annotations of each other. In addition, a user using the terminal can further show favor for and comment a web page annotation corresponding to another user account, thereby implementing interaction among multiple users.

Figure 9:
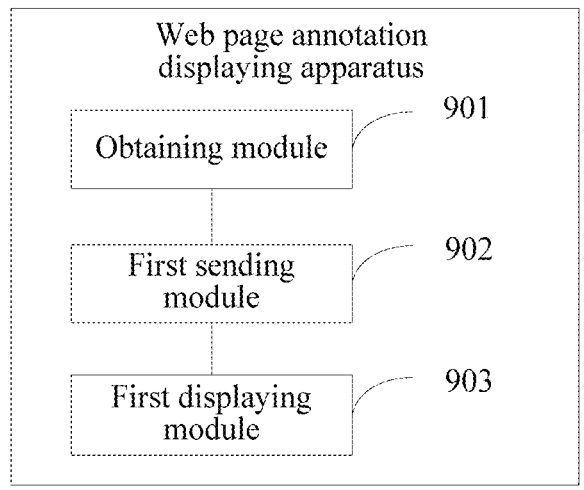
FIG. 9 is a schematic structural diagram a web page annotation displaying apparatus according to an embodiment of the present application.

FIG. 9 is a schematic structural diagram a web page annotation displaying apparatus according to an embodiment of the present application. As shown in FIG. 9, the apparatus includes:

an obtaining module 901, configured to obtain information content of a target web page when an instruction for displaying the target web page is received;

a first sending module 902, configured to send an annotation obtaining request to a server, the annotation obtaining request carrying an identifier of the target web page, so that the server returns a first web page annotation and information of first annotation position in the target web page, the first web page annotation including content that is annotated on the target web page before a current time, and the first annotation position information being used to determine a display position of the first web page annotation in the target web page; and a first displaying module 903, configured to display the first web page annotation on the target web page based on the first annotation position information after the first web page annotation and the first annotation position information are received.

Figure 10:
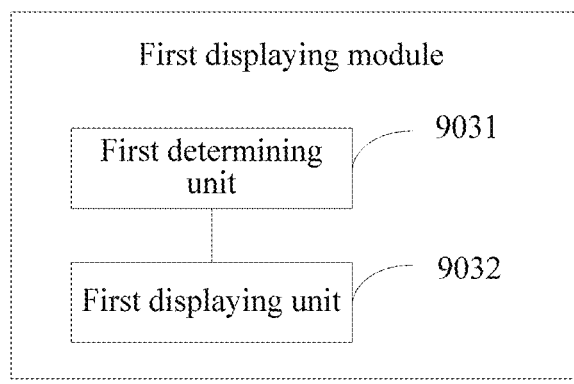
FIG. 10 is a schematic structural diagram of a first displaying module according to an embodiment of the present application.

Optionally, referring to FIG. 10, which is a schematic structural diagram of a first displaying module according to an embodiment of the present application, the first displaying module 903 includes:

a first determining unit 9031, configured to determine first selected text in the target web page based on selected area position information if the first annotation position information includes the selected area position information and first annotation box coordinates after the first web page annotation and the first annotation position information are received, where the first selected text is annotated by the first web page annotation, the selected area position information is used to determine a position of the first selected text in the target web page, the first annotation box coordinates are coordinates of a first annotation box on the target web page, and the first annotation box is an annotation box used to display the first web page annotation; and a first displaying unit 9033, configured to display the first web page annotation based on the position of the first selected text and the first annotation box coordinates.

Figure 11:
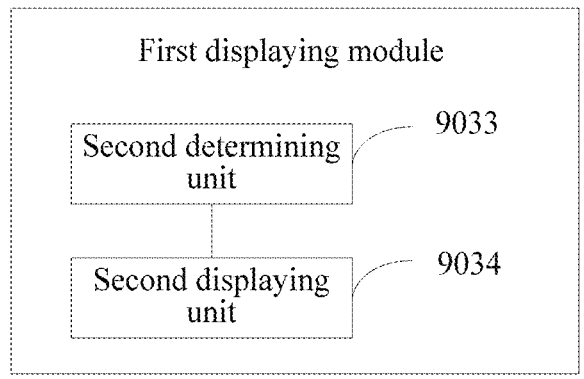
FIG. 11 is a schematic structural diagram of another first displaying module according to an embodiment of the present application.

Optionally, referring to FIG. 11, which is a schematic structural diagram of another first displaying module according to an embodiment of the present application, the first displaying module 903 includes:

a second determining unit 9033, configured to determine a first selected picture in the target web page based on first index information when the first annotation position information includes first relative coordinates and the first index information, where the first selected picture is annotated by the first web page annotation, the first index information is index information of the first selected picture in the target web page, the first relative coordinates are relative coordinates of the first annotation box in the first selected picture, and the first annotation box is an annotation box used to display the first web page annotation; and a second displaying unit 9034, configured to display the first web page annotation in the first selected picture based on the first relative coordinates.

Figure 12:
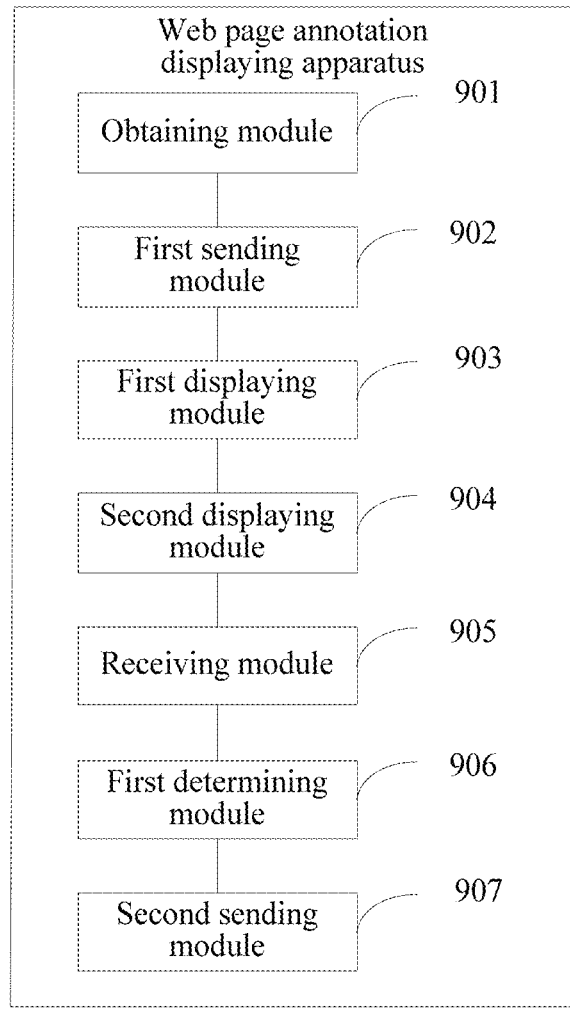
FIG. 12 is a schematic structural diagram another web page annotation displaying apparatus according to an embodiment of the present application.

Optionally, referring to FIG. 12, which is a schematic structural diagram another web page annotation displaying apparatus according to an embodiment of the present application, the apparatus further includes:

a second displaying module 904, configured to display an annotation input box based on the trigger point coordinates of the specified event, where the trigger point coordinates are coordinates of a trigger point of the specified event on the target web page;

a receiving module 905, configured to receive a second web page annotation currently entered into the annotation input box;

a determining module 906, configured to determine second annotation position information when an instruction indicating that the second web page annotation is completed is received, where the second annotation position information is used to determine a display position of the second web page annotation; and a second sending module 907, configured to send a user account that is currently associated with the terminal, the identifier of the target web page, the second web page annotation, and the second annotation position information to the server, so that the server stores the second web page annotation and the second annotation position information based on the user account and the identifier of the target web page.

Figure 13:
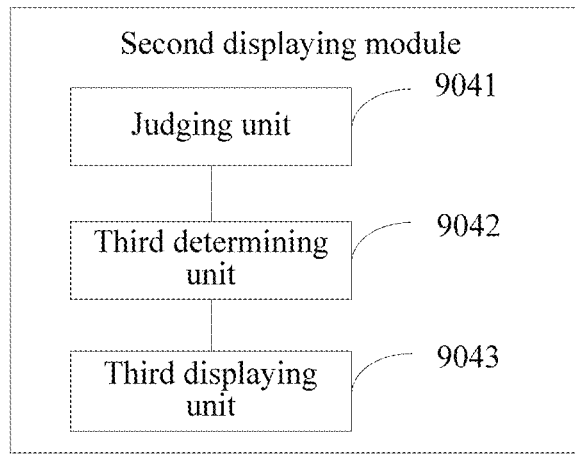
FIG. 13 is a schematic structural diagram of a second displaying module according to an embodiment of the present application.

Optionally, referring to FIG. 13, which is a schematic structural diagram of a second displaying module according to an embodiment of the present application, the second displaying module 904 includes:

a judging unit 9041, configured to judge whether information at the trigger point is text information or a picture based on the trigger point coordinates of the specified event when it is detected that the specified event for the information content is triggered;

a third determining unit 9042, configured to determine a target selected area based on the trigger point coordinates when the content of the target web page at the trigger point is text; and a third displaying unit 9043, configured to display the annotation input box based on a position of the target selected area.

Figure 14:
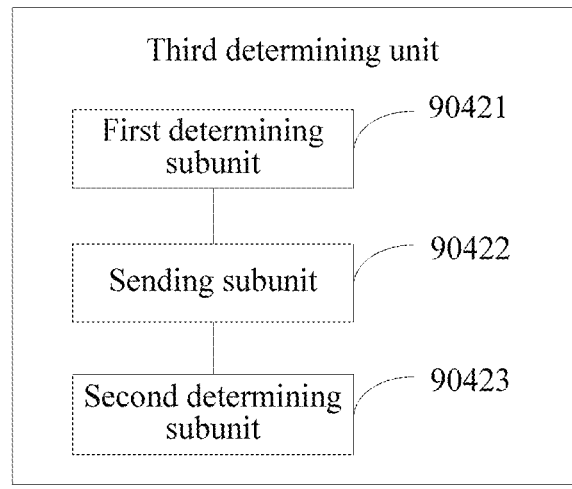
FIG. 14 is a schematic structural diagram of a third determining unit according to an embodiment of the present application.

Optionally, referring to FIG. 14, which is a schematic structural diagram of a third determining unit according to an embodiment of the present application, the third determining unit 9042 includes:

a first determining subunit 90421, configured to determine target text information from the information content of the target web page based on the trigger point coordinates when the content of the target web page at the trigger point is text;

a sending subunit 90422, configured to send the target text information to the server, so that the server selects multiple text keywords from the target text information, and returns the multiple text keywords; and a second determining subunit 90423, configured to determine the target selected area based on the multiple text keywords after the multiple text keywords are received.

Optionally, the second determining subunit 90423 is specifically configured to:

selecting a recommended keyword from the multiple text keywords;

generating a recommended selected area based on the recommended keyword, where the recommended selected area is used to mark the recommended keyword; and adjusting the recommended selected area after an adjustment operation for the recommended selected area is detected, to obtain the target selected area.

Figure 15:
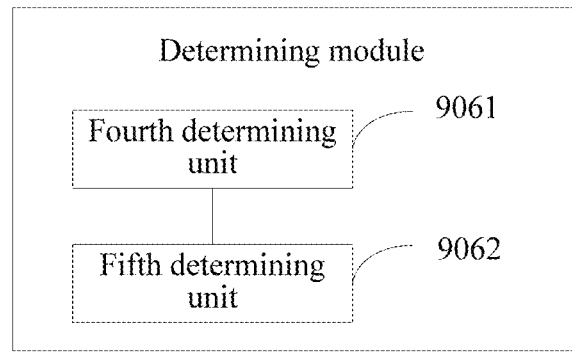
FIG. 15 is a schematic structural diagram of a determining module according to an embodiment of the present application.

Optionally, referring to FIG. 15, which is a schematic structural diagram of a determining module according to an embodiment of the present application, the determining module 906 includes:

a fourth determining unit 9061, configured to: determine selected area position information of the target selected area, and determine second annotation box coordinates, where the second annotation box coordinates are coordinates of the annotation input box on the target web page; and a fifth determining unit 9062, configured to determine the selected area position information of the target selected area and the second annotation box coordinates as the second annotation position information.

Figure 16:
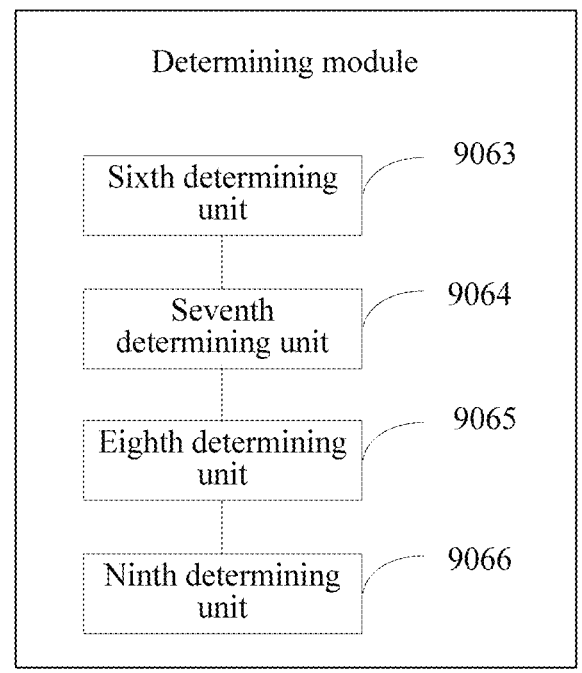
FIG. 16 is a schematic structural diagram of another determining module according to an embodiment of the present application.

Optionally, referring to FIG. 16, which is a schematic structural diagram of another determining module according to an embodiment of the present application, the determining module 906 includes:

a sixth determining unit 9063, configured to determine a picture at the trigger point as a second selected picture when the information at the trigger point is the picture, where the second selected picture is annotated by the second web page annotation;

a seventh determining unit 9064, configured to determine second relative coordinates based on the trigger point coordinates, where the second relative coordinates are relative coordinates of the trigger point in the second selected picture;

an eighth determining unit 9065, configured to determine second index information, where the second index information is index information of the second selected picture on the target web page; and a ninth determining unit 9066, configured to determine the second relative coordinates and the second index information as the second annotation position information.

To sum up, in this embodiment of the present application, when a terminal receives an instruction for displaying a target web page, the terminal obtains information content of the target web page, and sends an annotation obtaining request to a server, so that the server returns, based on an identifier of the target web page that is carried in the annotation obtaining request, a first web page annotation and information of first annotation position in the target web page. When the terminal receives the first web page annotation and the first annotation position information, the terminal accurately positions the first web page annotation based on the first annotation position information, so as to display the first web page annotation. In this way, the problem that a web page annotation may be incorrectly displayed when multiple pieces of same selected text information exist is avoided, and accuracy of displaying of the web page annotation is improved.

It should be noted that, the division of the above functional modules is only described for exemplary purposes when the web page annotation displaying apparatus provided in the foregoing embodiment displays a web page annotation. In actual application, the functions may be allocated to different functional modules according to specific needs, which means that the internal structure of the apparatus is divided into different functional modules to complete all or some of the above described functions. In addition, the web page annotation displaying apparatus provided in the foregoing embodiment is based on the same concept as the web page annotation displaying method in the foregoing embodiments. For the specific implementation process, refer to the method embodiments, and the details are not described herein again.

Figure 17:
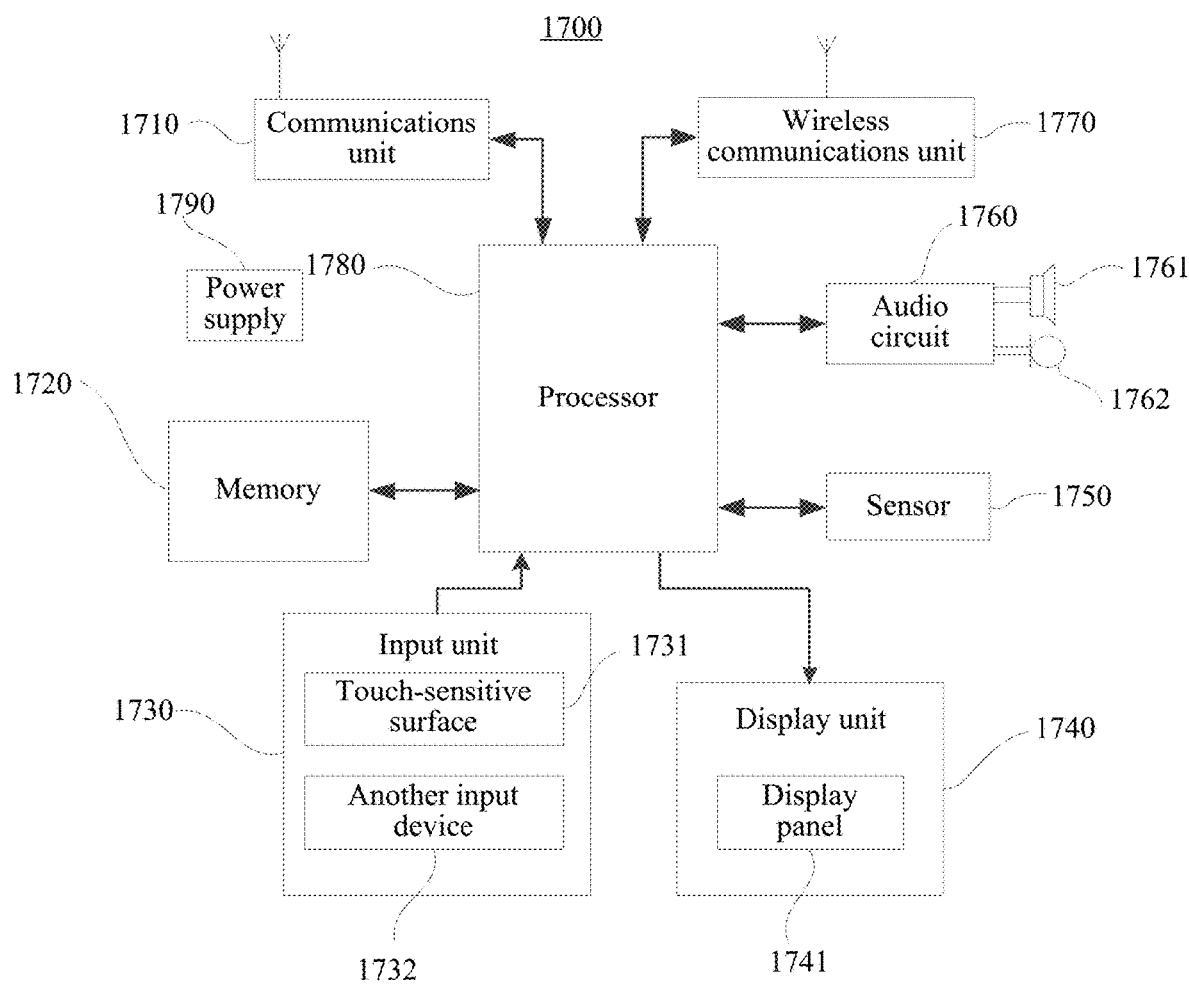
FIG. 17 is a schematic structural diagram of a mobile terminal according to an embodiment of the present application.

Referring to FIG. 17, FIG. 17 is a schematic structural diagram of a mobile terminal according to an embodiment of the present application. The mobile terminal 1700 may include components such as a communications unit 1710, a memory 1720 including one or more computer readable storage media, an input unit 1730, a display unit 1740, a sensor 1750, an audio circuit 1760, a Wireless Fidelity (WiFi) module 1770, a processor 1780 including one or more processing cores, and a power supply 1790. A person skilled in the art can understand that the structure of the mobile terminal shown in FIG. 17 does not constitute a limitation to the mobile terminal, and the mobile terminal may include more components or fewer components than those shown in the figure, or some components may be combined, or a different component deployment may be used.

The communications unit 1710 may be configured to receive and send signals during an information receiving and sending process or a call process. The communications unit 1710 may be a network communications device such as a radio frequency (RF) circuit, a router, or a modem. Particularly, when the communications unit 1710 is an RF circuit, the communications unit 1710 receives downlink information from a base station, then delivers the downlink information to the processor 1780 for processing, and sends related uplink data to the base station. Generally, the RF circuit as the communications unit includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 1710 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 1720 may be configured to store a software program and module. The processor 1780 runs the software program and module stored in the memory 1720, to implement various functional applications and data processing. The memory 1720 may mainly include a program storage area and a data storage area. The program storage area may store an operating system, an application program required by at least one function (such as a sound playback function and an image display function), and the like. The data storage area may store data (such as audio data and an address book) created according to use of the mobile terminal 1700, and the like. In addition, the memory 1720 may include a high speed random access memory, and may also include a non-transitory computer readable storage medium memory, such as at least one magnetic disk storage device, a flash memory, or another volatile solid-state storage device. Correspondingly, the memory 1720 may further include a memory controller, so as to provide access of the processor 1780 and the input unit 1730 to the memory 1720.

The input unit 1730 may be configured to receive input digit or character information, and generate a keyboard, mouse, joystick, optical, or track ball signal input related to the user setting and function control. Preferably, the input unit 1730 may include a touch-sensitive surface 1731 and another input device 1732. The touch-sensitive surface 1731, which may also be referred to as a touch screen or a touch panel, may collect a touch operation of a user on or near the touch-sensitive surface (such as an operation of a user on or near the touch-sensitive surface 1731 by using any suitable object or accessory, such as a finger or a stylus), and drive a corresponding connection apparatus according to a preset program. Optionally, the touch-sensitive surface 1731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 1780. Moreover, the touch controller can receive and execute a command sent from the processor 1780. In addition, the touch-sensitive surface 1731 may be a resistive, capacitive, infrared, or surface sound wave type touch-sensitive surface. In addition to the touch-sensitive surface 1731, the input unit 1730 may further include the another input device 1732. Preferably, the another input device 1732 may include, but is not limited to, one or more of a physical keyboard, a functional key (such as a volume control key or a switch key), a track ball, a mouse, and a joystick.

The display unit 1740 may be configured to display information input by the user or information provided for the user, and various graphical user interfaces of the mobile terminal 1700. The graphical user interfaces may be formed by a graph, a text, an icon, a video, or any combination thereof. The display unit 1740 may include a display panel 1741. Optionally, the display panel 1741 may be configured by using a liquid crystal display (LCD), an organic light-emitting diode (OLED), or the like. Further, the touch-sensitive surface 1731 may cover the display panel 1741. After detecting a touch operation on or near the touch-sensitive surface 1731, the touch-sensitive surface 1731 transfers the touch operation to the processor 1780, so as to determine the type of the touch event. Then, the processor 1780 provides a corresponding visual output on the display panel 1741 according to the type of the touch event. Although, in FIG. 17, the touch-sensitive surface 1731 and the display panel 1741 are used as two separate parts to implement input and output functions, in some embodiments, the touch-sensitive surface 1731 and the display panel 1741 may be integrated to implement the input and output functions.

The mobile terminal 1700 may further include at least one sensor 1750, such as an optical sensor, a motion sensor, and other sensors. Specifically, the optical sensor may include an ambient light sensor and a proximity sensor. The ambient light sensor can adjust luminance of the display panel 1741 according to brightness of the ambient light. The proximity sensor may switch off the display panel 1741 and/or backlight when the mobile terminal 1700 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile terminal 1700, are not further described herein.

The audio circuit 1760, a loudspeaker 1761, and a microphone 1762 may provide audio interfaces between the user and the mobile terminal 1700. The audio circuit 1760 may convert received audio data into an electric signal and transmit the electric signal to the loudspeaker 1761. The loudspeaker 1761 converts the electric signal into a sound signal for output. On the other hand, the microphone 1762 converts a collected sound signal into an electric signal. The audio circuit 1760 receives the electric signal and converts the electric signal into audio data, and outputs the audio data to the processor 1780 for processing. Then, the processor 1780 sends the audio data to, for example, another mobile terminal by using the communications unit 1710, or outputs the audio data to the memory 1720 for further processing. The audio circuit 1760 may further include an earplug jack, so as to provide communication between a peripheral earphone and the mobile terminal 1700.

To implement wireless communication, a wireless communications unit 1770 may be configured on the mobile terminal. The wireless communications unit 1770 may be a WiFi module. WiFi is a short distance wireless transmission technology. The mobile terminal 1700 may help, by using the wireless communications unit 1770, the user to receive and send e-mails, browse a webpage, access streaming media, and so on, which provides wireless broadband Internet access for the user. Although FIG. 17 shows the wireless communications unit 1770, it can be understood that the wireless communications unit 1770 is not a necessary component of the mobile terminal 1700, and when required, the wireless communications unit 1770 may be omitted as long as the scope of the essence of the present disclosure is not changed.

The processor 1780 is the control center of the mobile terminal 1700, and is connected to various parts of the mobile phone by using various interfaces and lines. By running or executing the software program and/or module stored in the memory 1720, and invoking data stored in the memory 1720, the processor 1780 performs various functions and data processing of the mobile terminal 1700, thereby performing overall monitoring on the mobile phone. Optionally, the processor 1780 may include one or more processing cores. Preferably, the processor 1780 may integrate an application processor and a modem. The application processor mainly processes an operating system, a user interface, an application program, and the like. The modem mainly processes wireless communication. It can be understood that the foregoing modem may also not be integrated into the processor 1780.

The mobile terminal 1700 further includes the power supply 1790 (such as a battery) for supplying power to the components. Preferably, the power supply may be logically connected to the processor 1780 by using a power management system, thereby implementing functions such as charging, discharging, and power consumption management by using the power management system. The power supply 1760 may further include one or more of a direct current or alternating current power supply, a re-charging system, a power failure detection circuit, a power supply converter or inverter, a power supply state indicator, and any other components.

Although not shown in the figure, the mobile terminal 1700 may further include a camera, a Bluetooth module, and the like, which are not further described herein.

In this embodiment, the mobile terminal further includes one or more programs. The one or more programs are stored in a memory, and are configured to be executed by one or more processors. The one or more programs include an instruction used to perform the web page annotation displaying method provided in the embodiments of the present application. The instruction is used to perform the following operations:

obtaining information content of a target web page when an instruction for displaying the target web page is received;

sending an annotation obtaining request to a server, the annotation obtaining request carrying an identifier of the target web page, so that the server returns a first web page annotation and information of first annotation position in the target web page, the first web page annotation being content of the web page annotation that is annotated on the target web page before a current time, and the first annotation position information being used to determine a display position of the first web page annotation in the target web page; and displaying the first web page annotation on the target web page based on the first annotation position information after the first web page annotation and the first annotation position information are received.

Optionally, the displaying the first web page annotation on the target web page based on the first annotation position information includes:

determining first selected text in the target web page based on selected area position information when the first annotation position information includes the selected area position information and first annotation box coordinates, where the first selected text is annotated by the first web page annotation, the selected area position information is used to determine a position of the first selected text in the target web page, the first annotation box coordinates are coordinates of a first annotation box on the target web page, and the first annotation box is an annotation box used to display the first web page annotation; and displaying the first web page annotation based on the position of the first selected text and the first annotation box coordinates.

Optionally, the displaying the first web page annotation on the target web page based on the first annotation position information includes:

determining a first selected picture in the target web page based on first index information when the first annotation position information includes first relative coordinates and the first index information, where the first selected picture is annotated by the first web page annotation, the first index information is index information of the first selected picture in the target web page, the first relative coordinates are relative coordinates of the first annotation box in the first selected picture, and the first annotation box is an annotation box used to display the first web page annotation; and displaying the first web page annotation in the first selected picture based on the first relative coordinates.

Optionally, after the displaying the first web page annotation on the target web page based on the first annotation position information, the following operation is further performed:

displaying an annotation input box based on the trigger point coordinates of the specified event, where the trigger point coordinates are coordinates of a trigger point of the specified event on the target web page;

receiving a second web page annotation currently entered into the annotation input box;

determining second annotation position information when an instruction indicating that the second web page annotation is completed is received, where the second annotation position information is used to determine a display position of the second web page annotation; and sending a user account that is currently associated with the terminal, the identifier of the target web page, the second web page annotation, and the second annotation position information to the server, so that the server stores the second web page annotation and the second annotation position information based on the user account and the identifier of the target web page.

Optionally, the displaying an annotation input box based on trigger point coordinates of a specified event includes:

determining whether content of the target web page at the trigger point is text or a picture based on the trigger point coordinates of the specified event;

determining a target selected area based on the trigger point coordinates when the content of the target web page at the trigger point is text; and displaying the annotation input box based on a position of the target selected area.

Optionally, the determining a target selected area based on the trigger point coordinates includes:

determining target text information from the information content of the target web page based on the trigger point coordinates;

sending the target text information to the server, so that the server selects multiple text keywords from the target text information, and returns the multiple text keywords; and determining the target selected area based on the multiple text keywords after the multiple text keywords are received.

Optionally, the determining the target selected area based on the multiple text keywords includes:

selecting a recommended keyword from the multiple text keywords;

generating a recommended selected area based on the recommended keyword, where the recommended selected area is used to mark the recommended keyword; and adjusting the recommended selected area after an adjustment operation for the recommended selected area is detected, to obtain the target selected area.

Optionally, the determining second annotation position information includes:

determining selected area position information of the target selected area, and determining second annotation box coordinates, where the second annotation box coordinates are coordinates of the annotation input box on the target web page; and determining the selected area position information of the target selected area and the second annotation box coordinates as the second annotation position information.

Optionally, the determining second annotation position information includes:

determining a picture at the trigger point as a second selected picture when the information at the trigger point is the picture, where the second selected picture is annotated by the second web page annotation;

determining second relative coordinates based on the trigger point coordinates, where the second relative coordinates are relative coordinates of the trigger point in the second selected picture;

determining second index information, where the second index information is index information of the second selected picture on the target web page; and determining the second relative coordinates and the second index information as the second annotation position information.

In the embodiments of the present application, when a terminal receives an instruction for displaying a target web page, the terminal obtains information content of the target web page, and sends an annotation obtaining request to a server, where the annotation obtaining request carries an identifier of the target web page, so that the server returns a first web page annotation and information of first annotation position in the target web page, where the first annotation position information is used to determine a display position of the first web page annotation in the target web page. When the terminal receives the first web page annotation and the first annotation position information, the terminal displays the first web page annotation on the target web page based on the first annotation position information. In the present disclosure, a web page annotation of a target web page is accurately positioned by using position information of the web page annotation, thereby avoiding the problem that a web page annotation may be incorrectly displayed when multiple pieces of same selected text information exist, and improving accuracy of displaying of the web page annotation.

In an exemplary embodiment, a non-transitory computer readable storage medium including instructions is further provided, for example, a memory including instructions, where the instructions may be executed by a processor of a mobile terminal to perform the foregoing web page annotation displaying method. For example, the non-transitory computer readable storage medium may be a ROM, a random access memory (RAM), a CD-ROM, a magnetic tape, a soft disk, an optical data storage device, or the like.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present application, but are not intended to limit the present disclosure. Any modification, equivalent replacement, or improvement made within the spirit and principle of the present disclosure shall fall within the protection scope of the present disclosure.

What is claimed is:

1. A method for annotating web pages performed at a terminal having one or more processors and memory storing a plurality of programs to be executed by the one or more processors, the plurality of programs including a social networking application that supports an online chat group of a plurality of members of the social networking application, and wherein the terminal is associated with a first member of the online chat group, the method comprising:

receiving, via a graphical user interface of the social networking application, a group chat message sent by a second member of the online chat group to the plurality of members of the online chat group, the group chat message including an instruction for displaying a target web page;

in response to a selection of the group chat message by the first member of the online chat group:

obtaining information content of the target web page in accordance with the instruction in the group chat message;

displaying the target web page within the graphical user interface of the social networking application in accordance with the information content;

sending an annotation obtaining request to a server of the social networking application, the annotation obtaining request carrying an identifier of the target web page;

receiving, from the server, a first web page annotation of the target web page and a first annotation position of the first web page annotation in the target web page, wherein the first web page annotation of the target web page includes content that was previously annotated on the target web page by another member of the online chat group at a time prior to the receiving the group chat message, and the first annotation position identifies a display position of the first web page annotation in the target web page;

displaying, within the graphical user interface of the social networking application, the target web page that includes the first web page annotation at the identified display position;

receiving a first user input comprising a long press on the graphical user interface of;

responsive to the first user input:

determining coordinates of the target web page that correspond to a position of the long press on the graphical user interface;

displaying an annotation box on the target web page based on the determined coordinates;

receiving and displaying, in the annotation box, a second web page annotation on the target web page by a user of the terminal; and sending, to the server, information of the second web page annotation on the target web page and a position of the second web page annotation on the target web page and an identifier of the first member of the online chat group at the social networking application, wherein the server is configured to:

share the information of the second web page annotation of the target web page with other members of the online chat group via the respective social networking applications associated with the other members in response to a subsequent user selection of a new group chat message including an instruction for displaying the target web page from the first member of the online chat group.

2. The method according to claim 1, wherein the first web page annotation is accessible to only members of the group chat of the social networking application.

3. The method according to claim 1, wherein displaying, within the graphical user interface of the social networking application, the target web page that includes the first web page annotation at the identified display position comprises:

determining first selected text in the target web page based on selected area position information when the first annotation position information comprises the selected area position information and first annotation box coordinates, wherein the first selected text is annotated by the first web page annotation, the selected area position information is used to determine a position of the first selected text in the target web page, the first annotation box coordinates are coordinates of a first annotation box on the target web page, and the first annotation box is an annotation box used to display the first web page annotation;

highlighting the first selected text in the target web page in a visually distinguishable manner; and dynamically rendering the first annotation box including the first web page annotation on the target web page based on the first annotation box coordinates.

4. The method according to claim 1, wherein displaying, within the graphical user interface of the social networking application, the target web page that includes the first web page annotation at the identified display position comprises:

determining a first selected picture in the target web page based on first index information when the first annotation position information comprises first relative coordinates and the first index information, wherein the first selected picture is annotated by the first web page annotation, the first index information is index information of the first selected picture in the target web page, the first relative coordinates are relative coordinates of a first annotation box in the first selected picture, and the first annotation box is an annotation box used to display the first web page annotation;

highlighting the first selected picture in the target web page in a visually distinguishable manner; and dynamically rendering the first annotation box including the first web page annotation on the first selected picture based on the first relative coordinates.

5. The method according to claim 1, wherein displaying an annotation input box on the target web page based on the determined coordinates comprises:

determining whether content of the target web page at the determined coordinates is text or a picture.

6. The method according to claim 5, further comprising:

when the content of the target web page at the determined coordinates is text:

determining a target selected area based on the determined coordinates;

determining target text information from the content of the target web page based on the determined coordinates;

sending the target text information to the server, wherein the server is configured to select multiple text keywords from the target text information via semantic analysis, and return the multiple text keywords;

determining the target selected area based on the multiple text keywords after the multiple text keywords are received; and displaying the annotation input box based on a position of the target selected area.

7. The method according to claim 6, wherein determining the target selected area based on the multiple text keywords comprises:

selecting a recommended keyword from the multiple text keywords;

generating a recommended selected area based on the recommended keyword, wherein the recommended selected area is used to mark the recommended keyword; and adjusting the recommended selected area after an adjustment operation for the recommended selected area is detected, to obtain the target selected area.

8. The method according to claim 5, further comprising:
when the content of the target web page at the determined coordinates is a picture: determining a picture at the determined coordinates as a second selected picture, wherein the second selected picture is annotated by the second web page annotation; determining second relative coordinates based on the determined coordinates, wherein the second relative coordinates are relative coordinates of the determined coordinates in the second selected picture; determining second index information, wherein the second index information is index information of the second selected picture on the target web page; and determining the second relative coordinates and the second index information as the second annotation position information.

9. A terminal for annotating web pages, the terminal associated with a first member of an online chat group of a social networking application, comprising:
one or more processors;
memory; and
a plurality of programs stored in the memory, the plurality of programs including the social networking application that supports the online chat group that includes a plurality of members of the social networking application, including the first member, wherein the plurality of programs when executed by the one or more processors, cause the terminal to perform operations comprising:
receiving, via a graphical user interface of the social networking application, a group chat message sent by a second member of the online chat group to the plurality of members of the online chat group, the group chat message including an instruction for displaying a target web page;
in response to a selection of the group chat message by the first member of the online chat group:
obtaining information content of the target web page in accordance with the instruction in the group chat message;
displaying the target web page within the graphical user interface of the social networking application in accordance with the information content;
sending an annotation obtaining request to a server of the social networking application, the annotation obtaining request carrying an identifier of the target web page;
receiving, from the server, a first web page annotation of the target web page and information of a first annotation position of the first web page annotation in the target web page, wherein the first web page annotation of the target web page includes content that was previously annotated on the target web page by another member of the online chat group at a time prior to the receiving the group chat message, and the first annotation position identifies a display position of the first web page annotation in the target web page;
displaying, within the graphical user interface of the social networking application, the target web page that includes the first web page annotation at the identified display position;
receiving a first user input comprising a long press on the graphical user interface of, the social networking application;
responsive to the first user input:
determining coordinates of the target web page that correspond to a position of the long press on the graphical user interface;
displaying an annotation box on the target web page based on the determined coordinates;
receiving and displaying, in the annotation box, a second web page annotation on the target web page by a user of the terminal; and
sending, to the server, information of the second web page annotation on the target web page and a position of the second web page annotation on the target web page and an identifier of the first member of the online chat group at the social networking application, wherein the server is configured to:
share the information of the second web page annotation of the target web page with other members of the online chat group via the respective social networking applications associated with the other members in response to a subsequent user selection of a new group chat message including an instruction for displaying the target web page from the first member of the online chat group.

10. The terminal according to claim 9, wherein the first web page annotation is accessible to only members of the group chat of the social networking application.

11. The terminal according to claim 9, wherein displaying, within the graphical user interface of the social networking application, the target web page that includes the first web page annotation at the identified display position comprises:
determining first selected text in the target web page based on selected area position information when the first annotation position information comprises the selected area position information and first annotation box coordinates, wherein the first selected text is annotated by the first web page annotation, the selected area position information is used to determine a position of the first selected text in the target web page, the first annotation box coordinates are coordinates of a first annotation box on the target web page, and the first annotation box is an annotation box used to display the first web page annotation;
highlighting the first selected text in the target web page in a visually distinguishable manner; and
dynamically rendering the first annotation box including the first web page annotation on the target web page based on the first annotation box coordinates.

12. The terminal according to claim 11, wherein displaying, within the graphical user interface of the social networking application, the target web page that includes the first web page annotation at the identified display position comprises:
determining a first selected picture in the target web page based on first index information when the first annotation position information comprises first relative coordinates and the first index information, wherein the first selected picture is annotated by the first web page annotation, the first index information is index information of the first selected picture in the target web page, the first relative coordinates are relative coordinates of a first annotation box in the first selected picture, and the first annotation box is an annotation box used to display the first web page annotation;
highlighting the first selected picture in the target web page in a visually distinguishable manner; and dynamically rendering the first annotation box including the first web page annotation on the first selected picture based on the first relative coordinates.

13. A non-transitory computer readable storage medium associated with a terminal for annotating web pages, the terminal having one or more processors storing a plurality of programs, the plurality of programs including a social networking application that supports an online chat group that includes a plurality of members of the social networking application, and wherein the terminal is associated with a first member of the online chat group, wherein the plurality of programs, when executed by the one or more processors, cause the terminal to perform operations comprising:

receiving, via a graphical user interface of the social networking applications a group chat message sent by a second member of the online chat group to the plurality of members of the online chat group, the group chat message including an instruction for displaying a target web page;

in response to a selection of the group chat message by the first member of the online chat group:
obtaining information content of the target web page in accordance with the instruction in the group chat message;
displaying the target web page within the graphical user interface of the social networking application in accordance with the information content;
sending an annotation obtaining request to a server of the social networking application, the annotation obtaining request carrying an identifier of the target web page;
receiving, from the server, a first web page annotation of the target web page and a first annotation position of the first web page annotation in the target web page, wherein the first web page annotation of the target web page includes content that was previously annotated on the target web page by another member of the online chat group at a time prior to the receiving the group chat message, and the first annotation position identifies a display position of the first web page annotation in the target web page;
displaying, within the graphical user interface of the social networking application, the target web page that includes the first web page annotation at the identified display position;
receiving a first user input comprising a long press on the graphical user interface of the social networking application;

responsive to the first user input:
determining coordinates of the target web page that correspond to a position of the long press on the graphical user interface;
displaying an annotation box on the target web page based on the determined coordinates;
receiving and displaying, in the annotation box, a second web page annotation on the target web page by a user of the terminal; and
sending, to the server, information of the second web page annotation on the target web page and a position of the second web page annotation on the target web page and an identifier of the first member of the online chat group at the social networking application, wherein the server is configured to:
share the information of the second web page annotation of the target web page with other members of the online chat group via the respective social networking applications associated with the other members in response to a subsequent user selection of a new group chat message including an instruction for displaying the target web page from the first member of the online chat group.

14. The non-transitory computer readable storage medium according to claim 13, wherein the first web page annotation is and accessible to only members of the group chat of the social networking application.

15. The non-transitory computer readable storage medium according to claim 13, wherein displaying, within the graphical user interface of the social networking application, the target web page that includes the first web page annotation at the identified display position comprises:
determining first selected text in the target web page based on selected area position information when the first annotation position information comprises the selected area position information and first annotation box coordinates, wherein the first selected text is annotated by the first web page annotation, the selected area position information is used to determine a position of the first selected text in the target web page, the first annotation box coordinates are coordinates of a first annotation box on the target web page, and the first annotation box is an annotation box used to display the first web page annotation;
highlighting the first selected text in the target web page in a visually distinguishable manner; and
dynamically rendering the first annotation box including the first web page annotation on the target web page based on the first annotation box coordinates.

* * * * *